US009356987B2

(12) United States Patent
Coulombe

(10) Patent No.: US 9,356,987 B2
(45) Date of Patent: May 31, 2016

(54) SYSTEM AND METHOD FOR OPTIMIZING A COMMUNICATION SESSION BETWEEN MULTIPLE TERMINALS INVOLVING TRANSCODING OPERATIONS

(71) Applicant: VANTRIX CORPORATION, Montreal (CA)

(72) Inventor: Stéphane Coulombe, Brossard (CA)

(73) Assignee: VANTRIX CORPORATION, Montreal (CA)

( * ) Notice: Subject to any disclaimer, the term of this patent is extended or adjusted under 35 U.S.C. 154(b) by 259 days.

(21) Appl. No.: 14/019,409

(22) Filed: Sep. 5, 2013

(65) Prior Publication Data

US 2014/0101328 A1    Apr. 10, 2014

Related U.S. Application Data

(60) Provisional application No. 61/711,701, filed on Oct. 9, 2012.

(51) Int. Cl.
*H04L 29/06* (2006.01)
*H04L 12/70* (2013.01)

(52) U.S. Cl.
CPC .......... *H04L 65/607* (2013.01); *H04L 65/4061* (2013.01); *H04L 2012/5616* (2013.01)

(58) Field of Classification Search
CPC .............. H04L 65/4061; H04L 65/607; H04L 2012/5616
See application file for complete search history.

(56) References Cited

U.S. PATENT DOCUMENTS 6,731,734 B1 *  5/2004  Shaffer et al. ............ 379/202.01
7,002,992 B1 *  2/2006  Shaffer et al. ................ 370/468
(Continued)

FOREIGN PATENT DOCUMENTS

CA      2824754     3/2011
EP      1558044     7/2005
(Continued)

OTHER PUBLICATIONS

F. Andreasen et al., Media Gateway Control Protocol (MGCP) Version 1.0, Cisco Systems, Jan. 2003, 210 P., IETF RFC.
(Continued)

*Primary Examiner* — Brian J Gillis
*Assistant Examiner* — Gil H. Lee
(74) *Attorney, Agent, or Firm* — IP-MEX Inc.; Victoria Donnelly

(57) ABSTRACT

System and method for optimizing a transcoding session between multiple terminals are disclosed. The method determines properties of the transcoding session, including a number of terminals participating in the transcoding session, media characteristics supported by each terminal, a measure of performance of the transcoding session to be optimized, and optionally a proportion of time involved in the transcoding session for each terminal. Then a cost function characterizing the measure of performance of the transcoding session and depending on the above properties of the transcoding session is built, followed by optimizing the cost function with respect to said measure of performance to determine an optimal measure of performance for the transcoding session and optimal values for the media characteristics for each terminal. In one embodiment, codecs used by multiple terminals and computational complexity of the transcoding session are optimized. A corresponding system for optimizing the transcoding session is also provided.

22 Claims, 16 Drawing Sheets

(56) References Cited

U.S. PATENT DOCUMENTS

| | | | |
|---|---|---|---|
| 7,359,731 B2 | 4/2008 | Choksi | |
| 7,627,629 B1 | 12/2009 | Wu et al. | |
| 7,688,764 B2 | 3/2010 | Dorenbosch et al. | |
| 2002/0116251 A1* | 8/2002 | Chen et al. | 705/10 |
| 2003/0028643 A1 | 2/2003 | Jabri | |
| 2003/0235184 A1 | 12/2003 | Dorenbosch et al. | |
| 2006/0013235 A1 | 1/2006 | Farnham | |
| 2006/0052127 A1 | 3/2006 | Wolter | |
| 2006/0052130 A1 | 3/2006 | Choksi | |
| 2007/0171841 A1* | 7/2007 | Witzel et al. | 370/254 |
| 2007/0177602 A1 | 8/2007 | Pichelin et al. | |
| 2008/0037573 A1* | 2/2008 | Cohen | 370/412 |

FOREIGN PATENT DOCUMENTS

| | | |
|---|---|---|
| JP | 2005039724 | 2/2005 |
| WO | 2005/026866 | 3/2005 |
| WO | 2005101876 | 10/2005 |
| WO | 2005104594 | 11/2005 |

OTHER PUBLICATIONS

C. Groves et al., Gateway Control Protocol Version 1, Nortel Networks Editors, Jun. 2003, 213 p., IETF RFC.

3GPP2 and its Organizational Partners, IP Multimedia Call Control Protocol Based on SIP and SDP—Stage 3, All-IP Core Network Multimedia Domain, Nov. 2005, 304 p., 3GPP2 TSG-X.

3GPP2 and its Organizational Partners, IP Multimedia Subsystem (IMS)—Stage 2, All-IP Core Network Multimedia Domain, Nov. 2005, 179 p., 3GPP2 TSG-X.

3GPP2 and its Organizational Partners, Push-to-Talk over Cellular (PoC) System Requirements, Sep. 29, 2005, 21 p., 3GPP2 TSG-X.

Open Mobile Alliance, Push to talk over Cellular (POC)—User Plane, OMA-TS_PoC-UserPlane-V1_0, Oct. 6, 2005, 167 p., Open Mobile Alliance Ltd.

Open Mobile Alliance, Push to talk over Cellular (POC)—Control Plane Document, OMA-TS-PoC-ControlPlane-V1_0, Oct. 6, 2005, 284 p., Open Mobile Alliance Ltd.

Open Mobile Alliance, Push to talk over Cellular (PoC)—Architecture, OMA-AD_PoC-V1_0-20050805-C, Aug. 5, 2005, 167p., Open Mobile Alliance Ltd.

E. Burger et al., Media Services in the IMS: Evolution for Innovation, 2006, 12p., Cantata Technology.

3rd Generation Partnership Project, Technical Specification Group Core Network, IP Multimedia (IM) session handling; IM call model; Stage 2, Dec. 2007, 60 p., 3GPP.

3rd Generation Partnership Project, Technical Specification Group Services and System Aspects, IP Multimedia Subsystem (IMS); Stage 2, Mar. 2008, 226 p., 3GPP.

3rd Generation Partnership Project, Technical Specification Group Services and System Aspects, Packet switched conversational multimedia applications; Default codecs (Release 7), Mar. 2008, 16 p., 3GPP.

M. Handley et al., SDP: Session Description Protocol, ISI/LBNL, Apr. 1998, 48 p., IETF RFC.

ITU-T Recommendation H.248.1, Gateway control protocol: Version 3, Series H: Audiovisual and Multimedia Systems, Infrastructure of audiovisual services—Communication procedures, Sep. 2005, 206 p., International Telecommunication Union.

3rd Generation Partnership Project, Technical Specification Group Core Network and Terminals, IP multimedia call control protocol based on Session Initiation Protocol (SIP) and Session Description Protocol (SDP); Stage 3 (Release 7), Mar. 2008, 477 p., 3GPP.

* cited by examiner

SYSTEM AND METHOD FOR OPTIMIZING A COMMUNICATION SESSION BETWEEN MULTIPLE TERMINALS INVOLVING TRANSCODING OPERATIONS

RELATED APPLICATIONS

The present application claims benefit from the U.S. provisional application Ser. No. 61/711,701 filed on Oct. 9, 2012, entire contents of which are incorporated herein by reference.

FIELD OF THE INVENTION

The present invention relates to transcoding media files or streams, and in particular, to a system and method for optimizing a communication session between two or more terminals involving transcoding operations.

BACKGROUND OF THE INVENTION

In communication sessions involving multiple users/parties/terminals, transcoding is often required to enable interoperability between terminals, for example terminals equipped with incompatible audiovisual codecs and therefore having incompatible characteristics. Transcoding operations between multiple terminals may be also required for other reasons such as reducing bandwidth usage or power consumed by a particular terminal or other reasons.

However, transcoding operations require significant computational complexity, bandwidth usage, energy usage and other resources, leading to high-energy consumption, ineffective utilization of hardware equipment, and resulting in high cost of such communication sessions.

Therefore, there is a need in the industry for conducting communication sessions between multiple terminals involving transcoding operations more effectively, with particular emphasis on utilizing fewer resources.

SUMMARY OF THE INVENTION

Therefore there is an object of the invention to provide a method and system for optimizing communication sessions between multiple terminals involving transcoding operations, for example between terminals having incompatible characteristics, or terminals having certain limitations on bandwidth usage or power usage or the like.

According to one aspect of the present invention there is provided a method for optimizing a measure of performance of a transcoding session between two or more terminals, including:
  (a) determining properties of the transcoding session, including:
    a number of terminals participating in the transcoding session,
    one or more media characteristics supported by each terminal, and
    the measure of performance of the transcoding session to be optimized;
  (b) building a cost function characterizing the measure of the transcoding session and depending on said properties of the transcoding session; and
  (c) optimizing the cost function with respect to said measure of performance to determine optimal values for the media characteristics for each terminal.

Alternatively, optimizing the cost function may include minimizing the cost function with respect to said measure of performance, or maximizing the cost function with respect to said measure of performance.

Beneficially, the one or more media characteristics may include a codec, and said measure of performance is a computation complexity of the transcoding session.

Alternatively, the measure of performance may be a bandwidth usage of the transcoding session, power consumed by the transcoding server used to perform the transcoding session, or a measure of performance of a CPU (central processing unit) used to perform the transcoding session.

Beneficially, building the cost function may include:
  determining a list of codecs supported by the transcoding session;
  determining a plurality of sets of codecs wherein each set is a combination of the codecs in the list of codecs that are compatible with each terminal; and
  determining a plurality of performance indexes for transcoding operations of transcoding from a source codec to a destination codec.

Furthermore, optimizing the cost function may include:
  computing a plurality of respective costs for each of the sets of codecs based on the properties of the transcoding session and the performance indexes; and
  choosing an optimum set of codecs from the plurality of sets of codecs for the transcoding session based on a minimum of the computed plurality of respective costs.

Beneficially, the plurality of respective costs may include computing a sum of the performance indexes of transcoding from the source codec to the destination codec.

According to another embodiment of the present invention there is provided a system for optimizing a measure of performance of a transcoding session between two or more terminals, including:
  a hardware processor; and
  a memory device, having computer readable instruction stored there on for execution by the processor, causing the processor to:
    (a) determine properties of the transcoding session, comprising:
      a number of terminals participating in the transcoding session, one or more media characteristics supported by each terminal, and the measure of performance of the transcoding session to be optimized;
    (b) build a cost function characterizing the measure of the transcoding session and depending on said properties of the transcoding session; and
    (c) optimize the cost function with respect to said measure of performance to determine optimal values for the media characteristics for each terminal.

Alternatively, optimizing the cost function may include minimizing the cost function with respect to said measure of performance, or maximizing the cost function with respect to said measure of performance.

Beneficially, the one or more media characteristics may include a codec, and said measure of performance is a computation complexity of the transcoding session.

Alternatively, the measure of performance may be a bandwidth usage of the transcoding session, power consumed by the transcoding server used to perform the transcoding session, or a measure of performance of a CPU (central processing unit) used to perform the transcoding session.

Beneficially, building the cost function may include:
  determining a list of codecs supported by the transcoding session;
  determining a plurality of sets of codecs wherein each set is a combination of the codecs in the list of codecs that are compatible with each terminal; and determining a plurality of performance indexes for transcoding operations of transcoding from a source codec to a destination codec.

Furthermore, optimizing the cost function may include:

computing a plurality of respective costs for each of the sets of codecs based on the properties of the transcoding session and the performance indexes; and choosing an optimum set of codecs from the plurality of sets of codecs for the transcoding session based on a minimum of the computed plurality of respective costs.

Beneficially, the plurality of respective costs may include computing a sum of the performance indexes of transcoding from the source codec to the destination codec.

Thus, an improved method and system for optimizing transcoding sessions between multiple terminals have been provided.

BRIEF DESCRIPTION OF THE DRAWINGS

Embodiments of the invention will now be described, by way of example, with reference to the accompanying drawings in which.

DETAILED DESCRIPTION OF EMBODIMENTS

Figure 1:
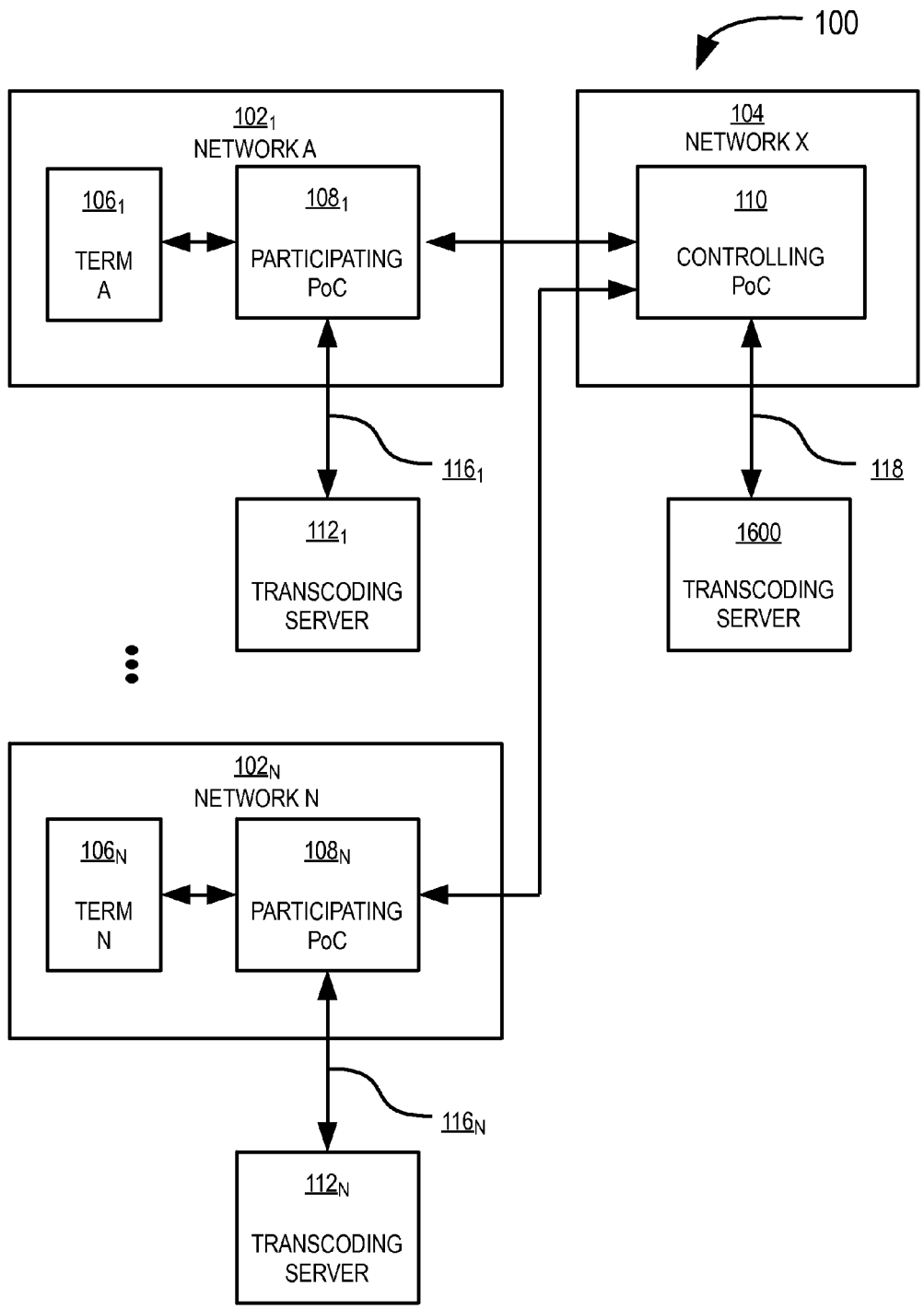
FIG. 1 is a block diagram of a Push-to-talk over Cellular (PoC) communication system in accordance with an embodiment of the present invention.

In the following description, reference is made to the accompanying drawings which form a part hereof, and in which are shown various non-restrictive illustrative embodiments in which the invention may be practiced. It is to be understood that other embodiments may be utilized, and structural and operational changes may be made without departing from the scope of the present invention.

In the following description, the present invention will be described in the context of a Push to Talk Over Cellular (PoC) system. However the present invention is not restricted to a PoC system and may be applied in other multiparty multimedia architectures where only one participant has permission to talk at any given time; the permission being managed by a central network element. The central network element may be any central element to the session including a Controlling PoC Function or a Multipoint Control Unit (MCU). The permission to talk may also be, in a more general context, any audiovisual media stream which is derived from one or many users and distributed to all users (for example, a video mosaic made from the video streams of several users or a mixing of several audio streams). It is to be noted also that although reference is made to talk burst and permission to talk, talking refers generally to the permission to send media streams to other participants, whether the media streams are audio, video, text, graphics or of other type. Therefore the term 'talk burst' will be used although the term 'media burst' may be more appropriate. This usage does not limit the scope of the invention, which applies to all types and combinations of media.

Two example embodiments of the present invention are described herein. A first embodiment provides a multi-party communications system and a method for optimizing a transcoding session therein with respect to computation complexity of transcoding operations (FIGS. 1 to 6). A second embodiment provides a multi-party communications system and a method for optimizing a transcoding session therein with respect to performance indexes (FIGS. 7 to 12).

The first example embodiment will now be described with reference to FIG. 1 in which there is shown a block diagram of a Push-to-talk over Cellular (PoC) communication system 100. N local networks $102_1$ to $102_N$ are interconnected to each other via a central network 104. Each local network $102_n$, for $1 \leq n \leq N$, includes a respective user's terminal $106_n$, connected to a respective Participating PoC (PPF) $108_n$. The central network 104 includes a Controlling PoC Function (CPF) 110 to which each PPF $108_n$ is operably connected. The connection between the different entities can be of different types such as wireless, wireline, using cables, or the like. Furthermore, to each local network $102_n$ and to the central network 104, a respective transcoding server $112_n$ and transcoding server 1600 are operably connected. More specifically, the transcoding server $112_n$ is connected to the PPF $108_n$ through a respective transcoding interface $116_n$. The Transcoding Server (TS) 1600 is connected to the CPF 110 through a transcoding interface 118. Such an architecture 100 allows the N users $106_1$ to $106_N$ to participate in a common communication session, controlled by the central network element CPF 110 and where one user at the time can transmit a media stream. PPFs $108_n$ and the CPF 110 are network elements, which are computers/servers, which are typically implemented as software running on a computer.

Moreover, FIG. 1 also illustrates a session flow between the different entities, for setting up the session. Once the session is active, the media flow may, for example, travel directly through the TS $112_n$ or pass by the CPF 110 and/or PPF $108_n$ prior to arriving at the TS $112_n$. Note that a PoC server may include the Controlling PoC Function (CPF) 110, the Participating PoC Function (PPF) $108_n$ or both, in other words the CPF 110 and PPF $108_n$ may constitute a single server, although they are logically separate function-wise.

Figure 2:
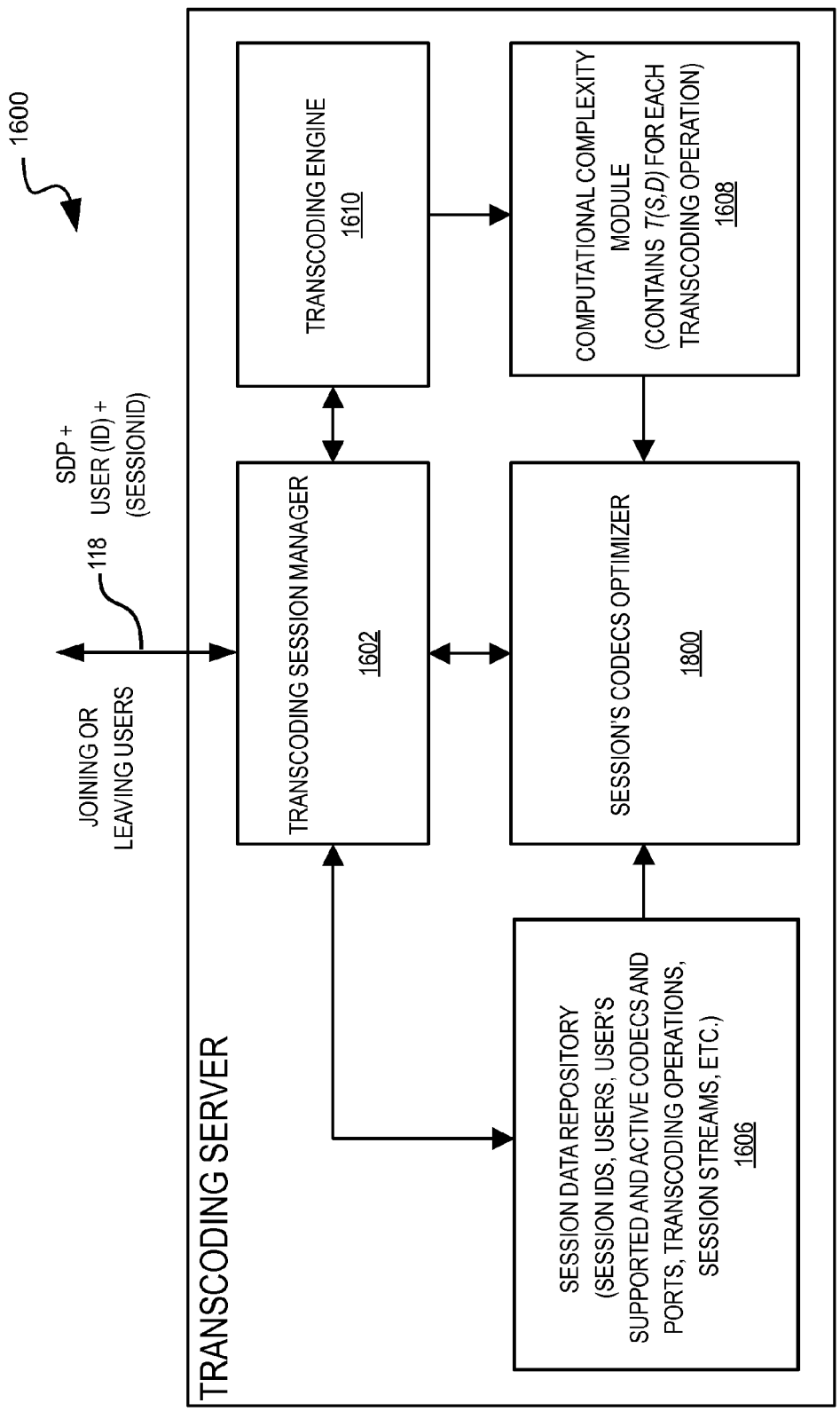
FIG. 2 is a block diagram of an embodiment a transcoding server shown in FIG. 1.

FIG. 2 shows a block diagram of the Transcoding Server 1600 shown in FIG. 1 for performing a transcoding session according to embodiments of the present invention.

The Transcoding Server 1600 may be implemented as hardware system such as server computer having one or more processors and a memory apparatus for storing computer readable instructions stored thereon for execution by the one or more processors, and forming various modules of the Transcoding Server 1600 as will be described below.

Alternatively, the Transcoding Server 1600 may be implemented as software having computer readable instructions stored on non-transitory computer readable storage medium, for example memory, for execution by a hardware processor. Similarly to the above, the computer readable instructions stored in the non-transitory computer readable storage medium form various modules of the Transcoding Server 1600 as will be described in below.

The Transcoding Server 1600 includes a Transcoding Session Manager 1602, a Transcoding Engine 1610, a Session Data Repository 1606, a Session Codecs Optimizer 1800, and a Computational Complexity Module 1608.

The Transcoding Session Manager 1602 is responsible for managing the overall operations of the Transcoding Server 1600 including managing transcoding sessions, managing input and output ports in the transcoding sessions, parsing incoming session descriptions and creating modified ones, controlling operations of the Transcoding Engine 1610, obtaining a list of optimal codecs from the Session's Codecs Optimizer 1800, and updating session data information in the Session Data Repository 1606. Note, while the embodiments described herein concern choosing optimal codecs, any media characteristic may be optimized and still be within the scope of the invention.

The Transcoding Engine 1610 is responsible for receiving media packets arriving at its ports, transcoding media packets into other formats, and retransmitting them to another destination as prescribed by the Transcoding Session Manager 1602. The Transcoding Engine 1610 also manages its own transcoding operations and input ports to comply with the requests of the Transcoding Session Manager 1602.

The Session Data Repository 1606 contains data that is required for conducting transcoding sessions by the Transcoding Server 1600. The Session Data Repository 1606 includes a list of active sessions along with respective IDs, a list of terminals participating in each session along with relevant information including a list of the codecs supported by the sessions, IP addresses and port numbers for the sessions, the actual codecs that are currently active in each session along with IP addresses, port numbers and other relevant information.

The Session Codecs Optimizer 1800 is responsible for providing, upon request, a list of optimal codecs for each terminal of a session to the Transcoding Session Manager 1602.

The Computational Complexity Module 1608 contains computational complexity values (or estimates thereof) T(s, d) for transcoding from source codec c to destination codec d. It contains such values for each transcoding operation supported by the Transcoding Engine 1610. Note that these values can be pre-configured (entered manually) or obtained from the Transcoding Engine 1610.

Note also that the Computational Complexity Module 1608 can contain complexity values for other aspects of the system 100, not limited to computational complexity, including any feature or combination of features as described herein with regard to the second example embodiment.

Therefore, the Computational Complexity Module 1608 can contain various complexity values (T(s,d)) and report them to the Session Codecs Optimizer 1800, for example, it could have one for computational complexity ($T_{CPU}(s,d)$), for bandwidth ($T_{BW}(s,d)$), for energy consumption ($T_{ENER}(s,d)$), for memory ($T_{MEM}(s,d)$), or the like.

One skilled in the art of system engineering can find various variants of the Transcoding Server 1600, including distributing the Transcoding Engine 1610 over several servers to perform load balancing, or distributing the roles of each components in a slightly different manner. For instance, one may want to merge the Transcoding Engine 1610 with the Computational Complexity Module 1608, or separate the Session Data Repository 1606 into several databases.

Whether the transcoding is centralized at the CPF 110, as shown in FIG. 1 and described in the US issued U.S. Pat. No. 8,019,371 of the same assignee, entire contents of which are incorporated herein by reference, or transparent transcoding centralized at the CPF 1402 as illustrated in FIG. 14 of U.S. Pat. No. 8,019,371 cited above, when a terminal is joining or leaving a multi-terminals session, his session description information is conveyed to the Transcoding Session Manager 1602. Also, the identity of the terminal and the session ID the terminal participates are known explicitly through his terminal ID and session ID (transcoding centralized at the CPF) or implicitly by the messages intercepted by the Transcoding Server 1600.

Once the information related to a terminal joining or leaving a session is conveyed to the Transcoding Session Manager 1602, the Transcoding Session Manager 1602 retrieves the session data from the Session Data Repository 1606 and requests the Session Codecs Optimizer 1800 to establish a list of optimal codecs for each terminal.

As explained herein below with regard to FIGS. 3A and 3B, if the optimal codecs are different from the ones currently used in the session, in other words if there at least one codec that differs, the Transcoding Session Manager 1602 updates the transcoding operations and communicate them to the Transcoding Engine 1610 (IP addresses and port port numbers for codecs will be established or updated by the Transcoding Engine 1610 and communicated to the Transcoding Session Manager 1602), prepare and send required RE-INVITE messages, with updated optimal codecs, IP addresses and ports information, to the required terminals, and update the Session Data Repository 1606 with the updated session information.

The RE-INVITE messages, instead of containing a long list of codecs supported by the Transcoding Server 1600, are modified in that they contain only the optimal codecs, for example one optimal video codec, one optimal audio codec, forcing the terminal to accept and use the optimal codecs in the session. The optimal codecs have been selected among those supported by the terminal. Please note that many variations and modifications to this system and its components are possible to achieve the tasks described above.

Note that the proportion of the time that each terminal talks compared to the other terminals in a session, if available, is stored in the Session Data Repository 1606.

Alternatively, since the Transcoding Engine 1610 receives media packets related to the session, the Transcoding Engine 1610 is capable of estimating that proportion of time, and providing this information to the Transcoding Session Manager 1602. The Transcoding Session Manager 1602 then processes the information and stores it in the Session Data Repository 1606.

Figure 3A:
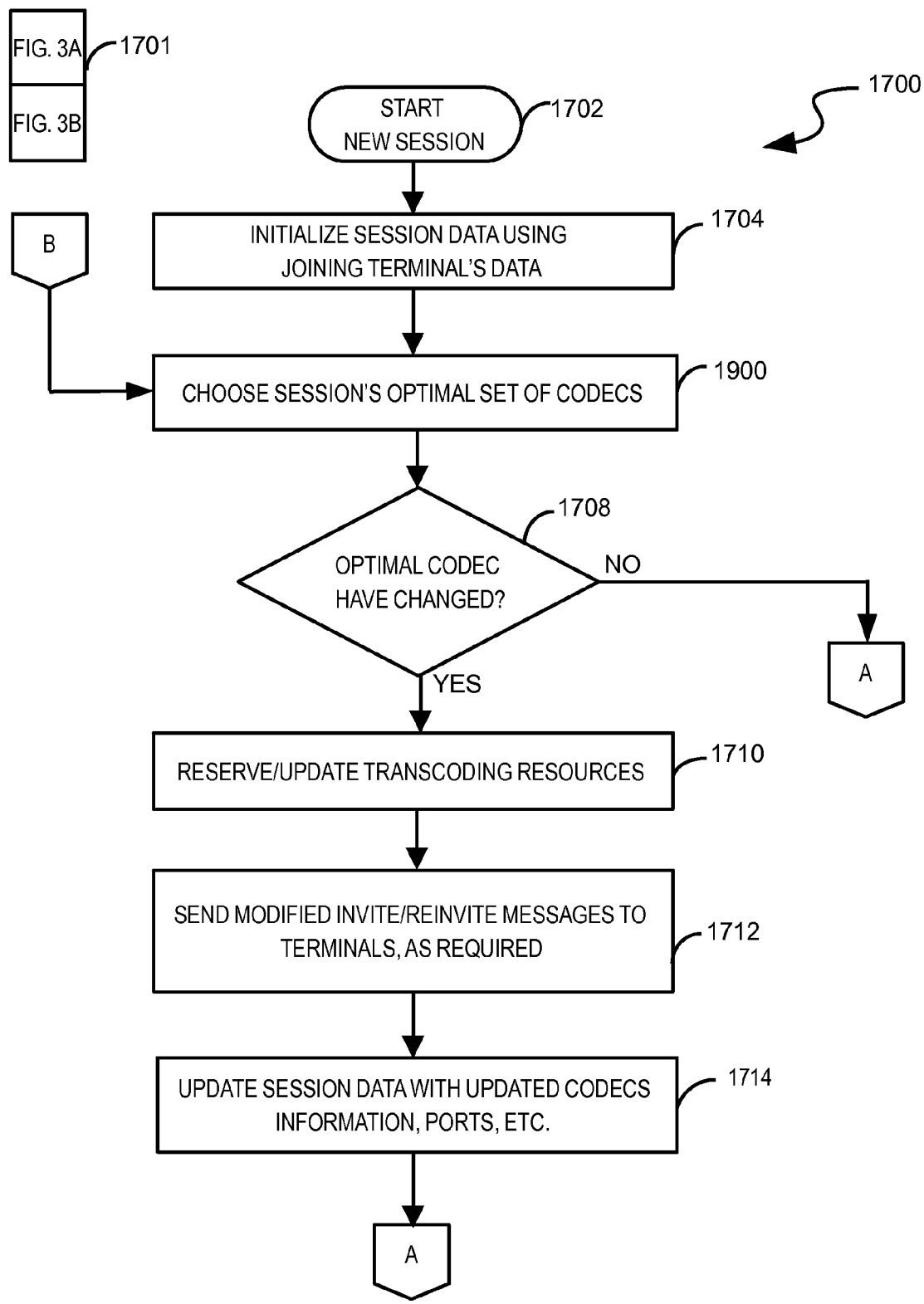
FIGS. 3A and 3B show a flowchart of a method for managing a transcoding session performed by the transcoding server shown in FIG. 2.
Figure 3B:
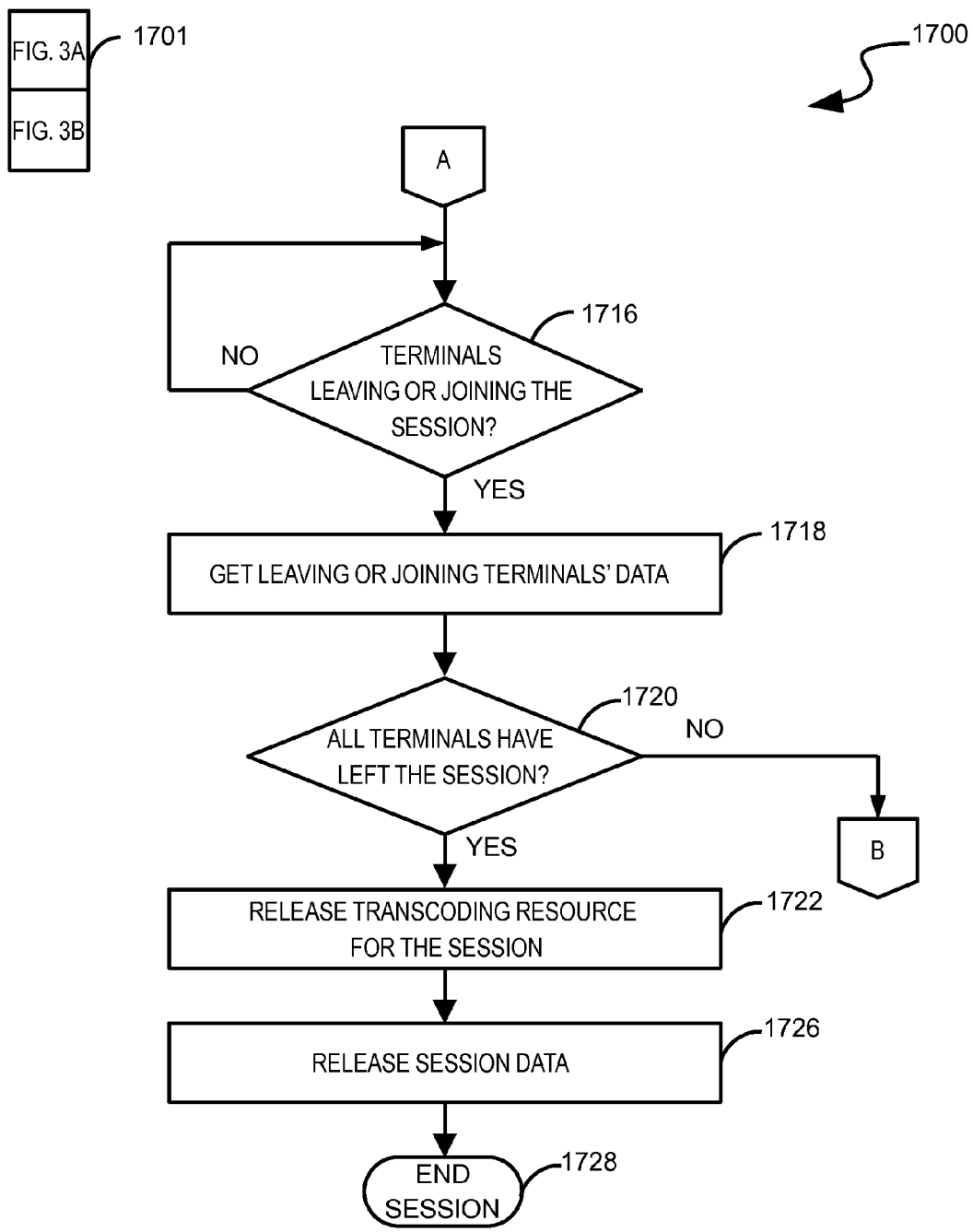

FIGS. 3A and 3B show a flowchart of a method 1700 used in managing an optimized multi-terminal session performed by the Transcoding Session Manager 1602 of the Transcoding Server 1600. A legend 1701 shows an arrangement of FIGS. 3A and 3B.

Upon Start of a New Session 1702, the method 1700 initializes session data using joining terminals' data 1704. Such data is obtained from the joining terminals' supported codecs, IP addresses and port numbers, or the like. The initialization process includes creating a session ID, adding the joining terminal to the session and storing the session data in the Session Data Repository 1606.

Next, step 1900 determines an optimal set of codecs for the transcoding session using the Session Codecs Optimizer 1800. Step 1900 is described herein below with regard to FIGS. 4, 5A, and 5B.

Step 1708 then checks whether or not the optimal set of codecs have changed. If so, step 1708 exits 'Yes', and reserves or updates 1710 the transcoding resources at the Transcoding Engine 1610. When the session is initiated, it is considered that the optimal codecs have changed. Otherwise the method 1700 exits 'No' from step 1708 and checks whether terminals are leaving or joining the session 1716.

After having reserved or updated the transcoding resources 1710, the method 1700 sends modified INVITE/REINVITE messages to the terminals as required 1712. The modifications include session description modifications with updated codecs and transport information, for example, the IP addresses and port numbers. Only session descriptions that have changed are sent to terminals. For instance, if the optimized codecs do not affect a certain terminal, for example his optimal codec remained the same, then sending a REINVITE may not be required. When the session is started, the INVITE message from the terminal initiating the session is modified as described previously to include additional codecs for which the Transcoding Engine 1610 can perform transcoding and permit interoperability (or codecs that it is known the recipient supports, for example: when a terminal capability database exists).

In the next step 1714, the method 1700 updates the session data with updated optimal codecs information, IP addresses, port numbers, as well as answers from terminals, if they have accepted the REINVITE invitation.

In the next step 1716, the method 1700 checks whether terminals are leaving or joining the session. If so, the method 1700 exits 'Yes' from step 1716 and obtains data related to terminals leaving or joining the session 1718. Otherwise the step 1716 exits 'No' from step 1716 and loops back to the input of step 1716 to check whether terminals are leaving or joining the session.

If a terminal joins or leaves the session, the optimal set of codecs used in the session may change. In this case, it may be worth modifying the existing session, for example by changing the set of media codecs used in the transcoding session. It is also possible to modify the current transcoding session if the proportion of the time that terminals talk change significantly, and better system performance can be achieved by modifying the current codecs, even though no one has joined or left the communication session. It is also possible to modify the current transcoding session if a performance problem (an event affecting negatively the session) has occurred or if the real-time measurements of the performance assessment module have changed significantly the values of the performance indexes, and better system performance can be achieved by modifying the current codecs, even though no one has joined or left the communication session. For instance, if a quality of service problem occurred (which can be detected by the analyzing the communication between the transcoder and terminals participating to the session), then more bandwidth-efficient codecs may be selected for problematic communication paths. Changes may also occur in various other cases such as if power consumption or computational complexity at the transcoder exceeded a maximum acceptable value.

In RFC (Request for Comments published by the Internet Engineering Task Force (IETF)) 3261 (SIP: Session Initiation Protocol), section 14 explains in detail how to modify an existing session. It mentions that this modification can involve adding a media stream, deleting a media stream, and so on. This is accomplished by sending a new INVITE request within the same dialog that established the session. An INVITE request sent within an existing dialog is known as a re-INVITE.

RFC 3264 (An Offer/Answer Model Session Description Protocol) provides further details on the re-INVITE process related to media codecs. In particular, section 8.3, describes a procedure to modify media streams and mentions that nearly all characteristics of a media stream can be modified. Section 8.3.2 provides details how to change the set of media formats, reciting:

"The list of media formats used in the session may be changed. To do this, the offerer creates a new media description, with the list of media formats in the "m=" line different from the corresponding media stream in the previous SDP. This list may include new formats, and may remove formats present from the previous SDP."

The communication system may decide to modify the session each time a terminal joins or leaves the session, if it leads to a change in the optimal transcoding operations, or each time there is a significant difference between the current average complexity associated with the current transcoding operations in the session and the optimal average complexity achievable by modifying the session.

After having obtained leaving or joining terminals' data 1718, the method 1700 checks whether all terminals have left the session 1720. If not, the method 1700 exits 'No' from step 1720 and loops back to the input of step 1900 to determine the optimal set of codecs for the session. Otherwise the method 1700 exits 'Yes' from step 1720 and releases transcoding resources for the session 1722. This is performed by informing the Transcoding Engine 1610 that any transcoding related to the session needs to be released. In an alternative embodiment, the Transcoding Session Manager 1602 may request the Transcoding Engine 1610 to release individual transcoding operations. In the next step 1726, the method 1700 releases the session data, which is performed by deleting the session ID and its data in the Session Data Repository 1606, followed by the termination of the session 1728.

Note that the codec optimization process requires knowledge of the capabilities of terminals for each terminal. Such lists of terminals' supported codecs is stored in the Session Data Repository 1606. In another embodiment, it could also be stored in a separate database storing capabilities of participating terminals. If, for some reason, this data is not available, or only partially available, other means should be used to obtain it. For instance, in RFC 3261, the OPTIONS method can be used to query a terminal agent as to its capabilities. Alternatively, an INVITE message without media codecs can be used to learn codec capabilities if a terminal, where the terminal will provide a list of codecs in the response.

Figure 4:
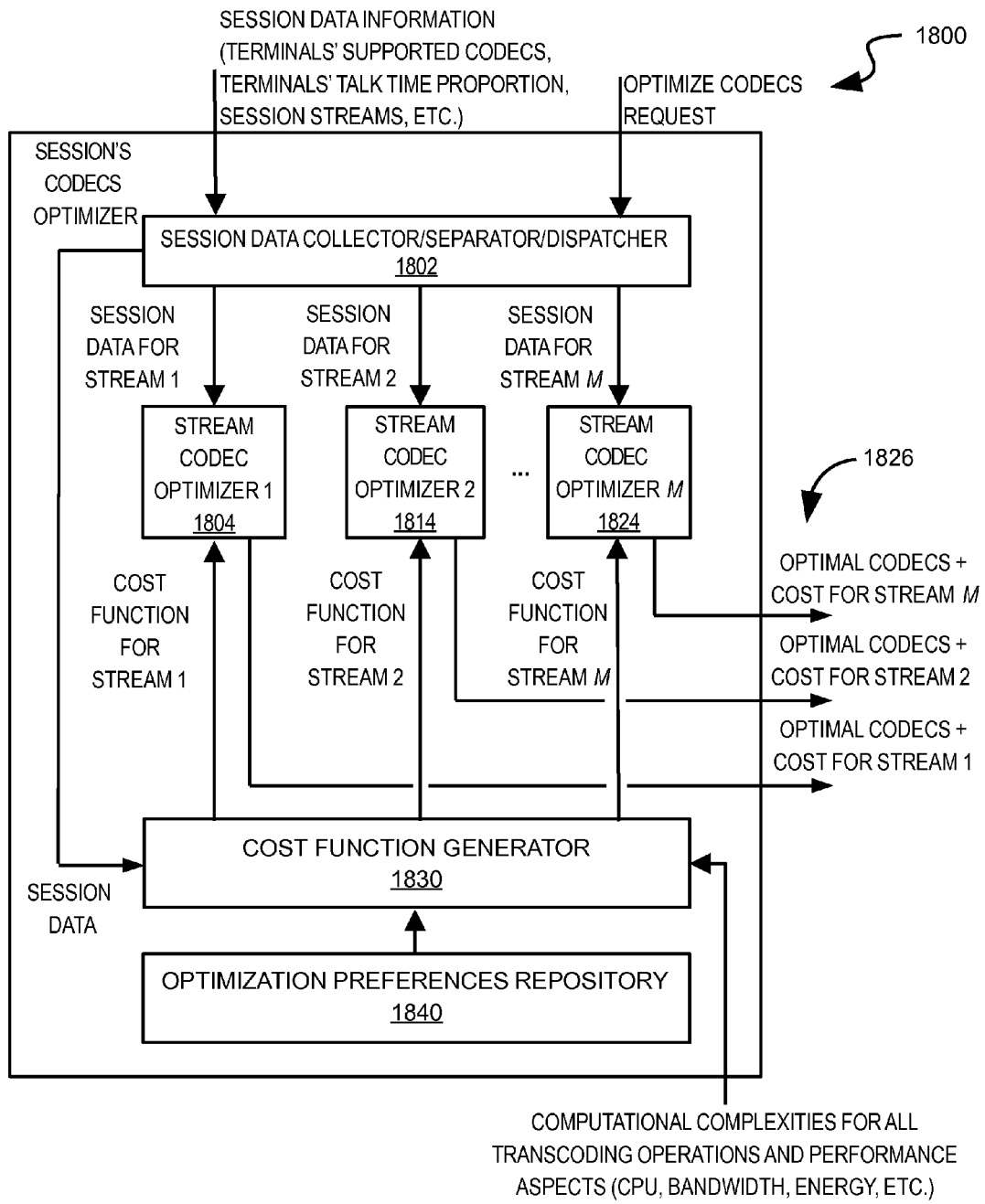
FIG. 4 is a block diagram of a Session Codecs Optimizer shown in FIG. 2.

FIG. 4 shows a detailed architecture of the Session Codecs Optimizer 1800 shown in FIG. 2 according to the embodiment of this invention. The Session Codecs Optimizer 1800 comprises a Session Data Collector/Separator/Dispatcher 1802, one or more Stream Codec Optimizers (such as Stream Codec Optimizer 1 1804, Stream Codec Optimizer 2 1814, and Stream Codec Optimizer M 1824, a Cost Function Generator 1830 and an Optimization Preferences Repository 1840.

As any other module of the Transcoding Server 1600, the Session Codecs Optimizer 1800 may include a memory device, having computer readable instructions stored thereon for execution by a processor, causing the processor to perform the functionality as described herein.

The Session Data Collector/Separator/Dispatcher 1802 is responsible for receiving the Session data information, processing it and dispatching it to appropriate modules.

The Stream Codec Optimizers 1804, 1814, 1824 are responsible for determining optimal codecs and the optimal value of the cost function for each stream. The Cost Function Generator 1830 is responsible for generating a cost function for each media stream based on the session data, optimization preferences, and computational complexities for transcoding operations and performance aspects. The Optimization Preferences Repository 1840 contains preferences and parameters affecting the cost function.

The following describes the interaction between the components of FIG. 4. (Original) Upon receiving a request from the Transcoding Manager 1602 of FIG. 2 for optimized codecs, the Session Data Collector/Separator/Dispatcher 1802 receives the Session data information from the Session Data Repository 1606 and the Transcoding Session Manager 1602 of FIG. 2, processes and separates the information into streams and dispatches it to the various Stream Codec Optimizers 1804, 1814, and 1824.

The separated stream information contains, for each stream, the information that is required to perform optimization for that specific stream such as supported codecs for that stream (for example: audio or video codecs supported by each terminal i to determine the sets $S_{audio}(i)$ or $S_{video}(i)$ in the previous equations), proportion of talk times ($\alpha_i$, if available).

The Session Data Collector/Separator/Dispatcher 1802 also processes and separates the information into session data that is required to generate a cost function for each stream (how many streams to optimize, nature of the streams such as audio or video, the number of supported codecs for each terminal and stream, whether the proportion of talk time is known or not) and dispatches it to the Cost Function Generator 1830.

The Cost Function Generator 1830 generates a cost function for each media stream based on the session data, optimization preferences (for example: if CPU or bandwidth should be optimized or the weight $\beta_{CPU}$ and $\beta_{BW}$ that should be Assigned to Each Property/Feature to be Optimized) received from the Optimization Preference Repository 1840, and computational complexities for transcoding operations and performance aspects (CPU, bandwidth, energy, or the like) received from the Computational Complexity Module 1608 of FIG. 2.

The cost function for each media stream is sent to the respective Stream Codec Optimizers 1804, 1814, and 1824. A required number of Stream Codec Optimizers can be provided, depending on the number of streams in the session, for example, if there are M streams in the session, there may be M Stream Codec Optimizers. The Stream Codec Optimizers 1804, 1814, and 1824 determine the optimal set of codecs for each stream, for example: vectors $C^*_{audio}$ or $C^*_{video}$ as described in equations 5-6 shown herein below, based on their respective session data obtained from the Session Collector/Separator/Dispatcher 1802 and cost function obtained from the Cost Function Generator 1830.

The Stream Codec Optimizers 1804, 1814, and 1824 also determine the optimal cost for each stream (for example: $A^*_{audio}$ or $A^*_{video}$ as shown in the equations 5-6 shown herein below) according to their respective cost function. The optimal sets of codecs and optimal costs are transmitted to the Transcoding Manager 1602.

The described method and system have the advantage of being simple to manage, because each stream is processed individually without considering other streams. This solution is appropriate for typical sessions comprising a single audio stream or one audio and one video streams. However, if a session contains multiple audio and video streams, it may be beneficial to optimize per media type instead of per media stream. However, more processing is required to map sessions to media types. Someone skilled in the art of system engineering will know how to modify the system 100 to accommodate these various scenarios without deviating from the scope of this invention.

When multiple streams need to be optimized jointly, the Stream Codec Optimizer 1804, 1814 or 1824 does not optimize for a single stream but for a combination of streams. Therefore, the Session Data Collector/Separator/Dispatcher 1802 provides the session data for streams that need to be optimized jointly, that is for a combination of streams. In particular, the Session Data Collector/Separator/Dispatcher 1802 provides a set J(i) containing, for all 1≤i≤N, a set of all vectors (for example: of the form ($J_{audio}(i), J_{video}(i)$) representing combinations of media streams in that are supported by the terminal i.

Also, the Cost Function Generator 1830 provides to the Stream Codec Optimizers 1804, 1814, 1824 the cost function required to jointly optimize these streams (or alternatively, only one of the Stream Codec Optimizers 1804, 1814 or 1824 can be used). The Stream Codec Optimizers 1804, 1814 or 1824 then optimizes jointly and returns the optimal codecs for the joint streams and the optimal costs 1826.

Figure 5A:
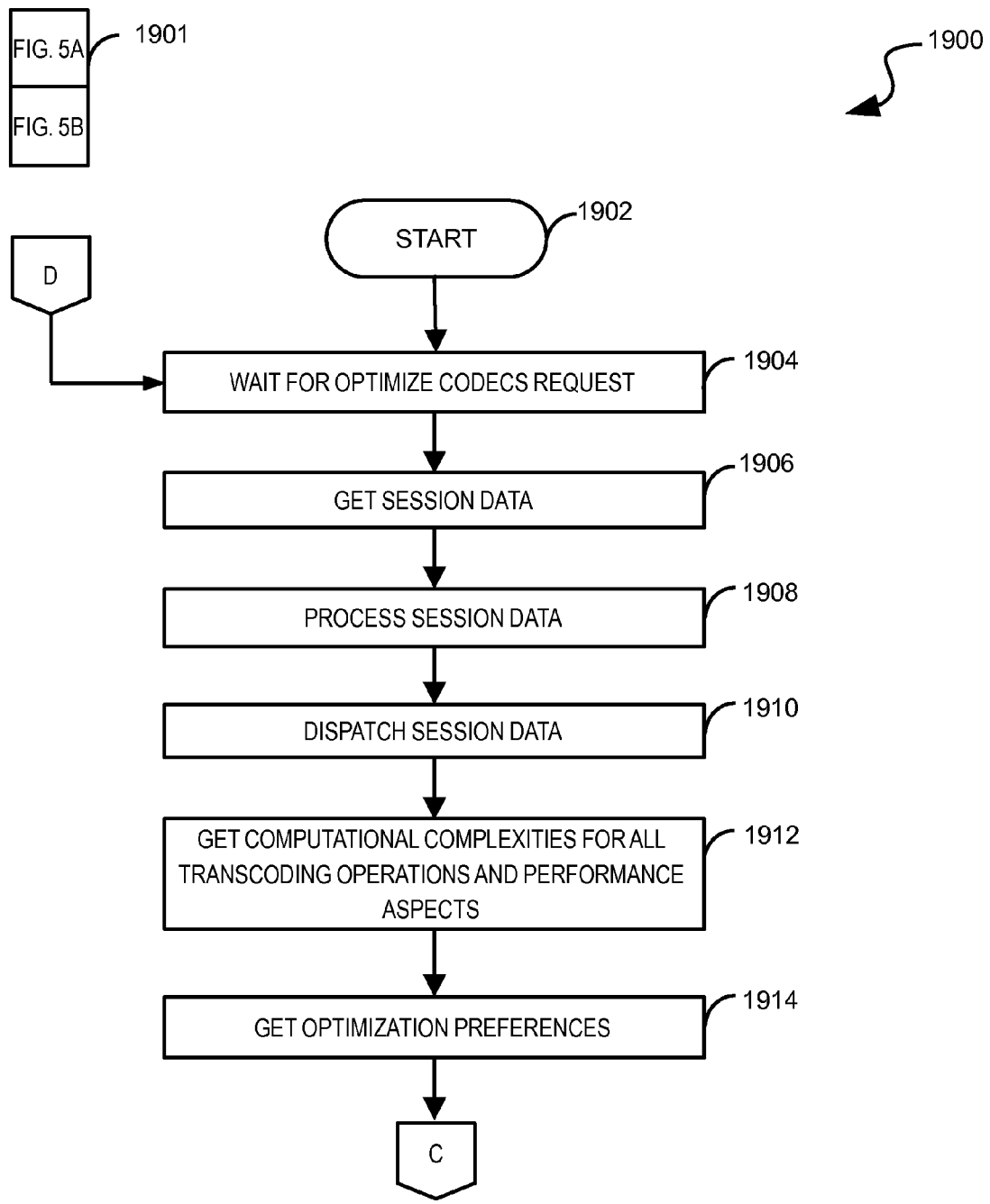
FIGS. 5A and 5B show a flowchart of a method for optimizing a measure of performance of a transcoding session performed by the Session Codec Optimizer shown in FIG. 4.
Figure 5B:
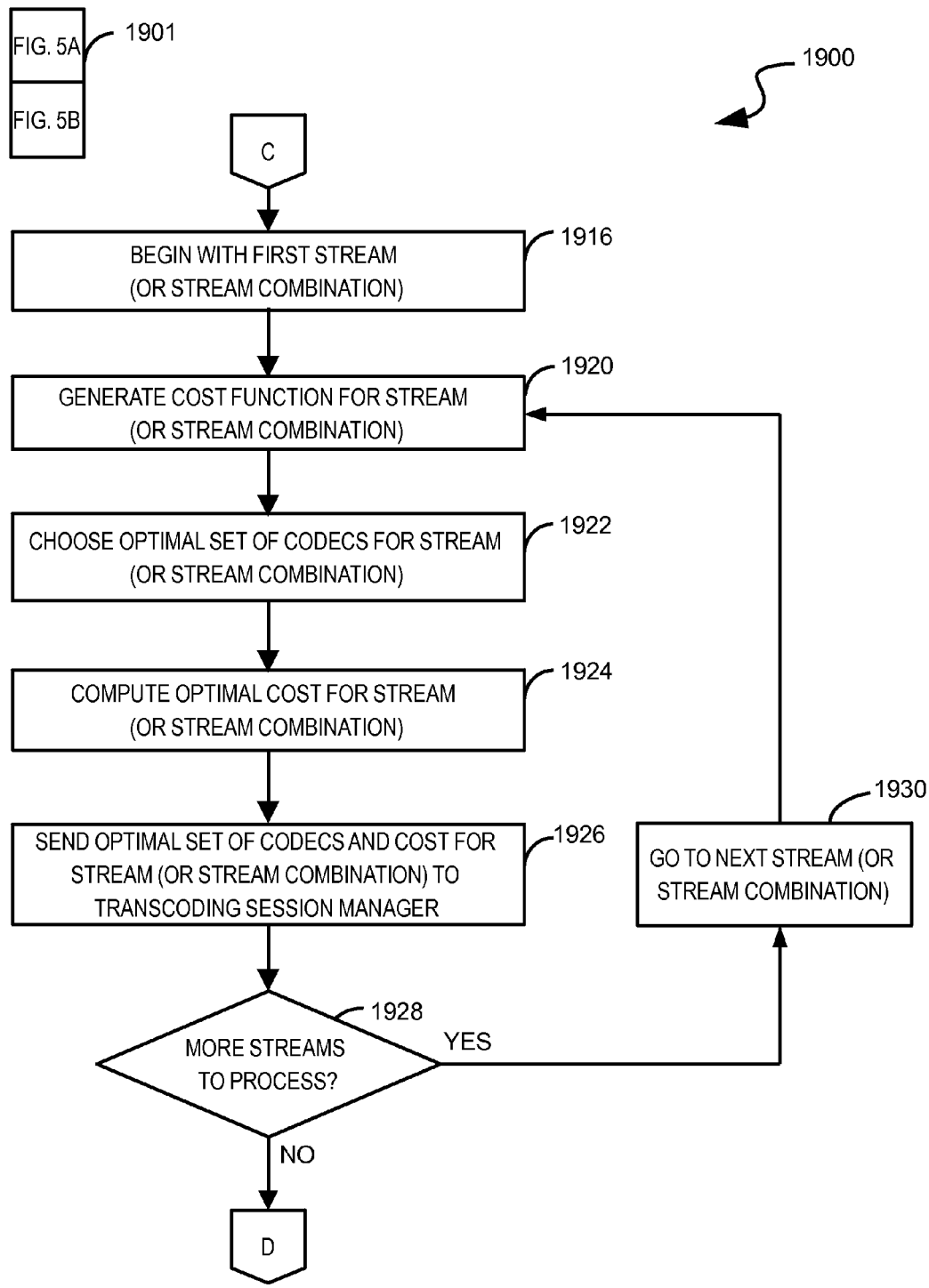

FIGS. 5A and 5B show a flowchart of a method 1900 used in optimizing a measure of performance of a transcoding session performed by the Session Codec Optimizer 1800. A legend 1901 shows an arrangement of FIGS. 5A and 5B.

Upon Start 1902, the method 1900 waits for an optimize codecs request 1904 from the Transcoding Session Manager 1602. Once received, the method 1900 moves to the next step where it obtains the session data 1906. It then processes the session data in the next step 1908, including separation of information into streams and into session data that is required to generate a cost function for each stream (as described with regard to FIG. 4 above).

The method 1900 then dispatches 1910 the processed data to the various modules of the Session Codec Optimizer 1800. The method 1900 then obtains computational complexities for transcoding operations and performance aspects 1912 from the Computational Complexity Module 1608.

In the next step 1914, the method 1900 obtains optimization preferences from the Optimization Preference Repository 1840. The method 1900 then begins with the first stream or stream combination 1916. It then generates a cost function for the stream or stream combinations 1920 in accordance with the method as described above. Using the generated cost function, the method 1900 determines the optimal set of codecs for the stream of stream combinations 1922. This is performed by evaluating the cost function for each possible combination of codecs supported by the terminals and finding the combination leading to the smallest cost. Step 1922 is further described with regard to FIG. 6 below.

The method 1900 also computes the optimal cost, associated with the optimal codecs, for the stream or stream combination in step 1924. Example embodiments of the cost function used in steps 1920, 1922, and 1924 are described in more detail herein below.

In the next step 1926, the method 1900, sends the set of optimal codecs and the cost for the stream or stream combination to the Transcoding Session Manager 1602. The method 1900 then checks if more streams need to be processed 1928. If so, the method 1900 exits 'Yes' from step 1728 and starts processing the next stream or stream combination 1930. Otherwise the method 1900 exits 'No' from step 1928 and waits for a request to optimize codecs 1904 from the Transcoding Session Manager 1602.

Figure 6:
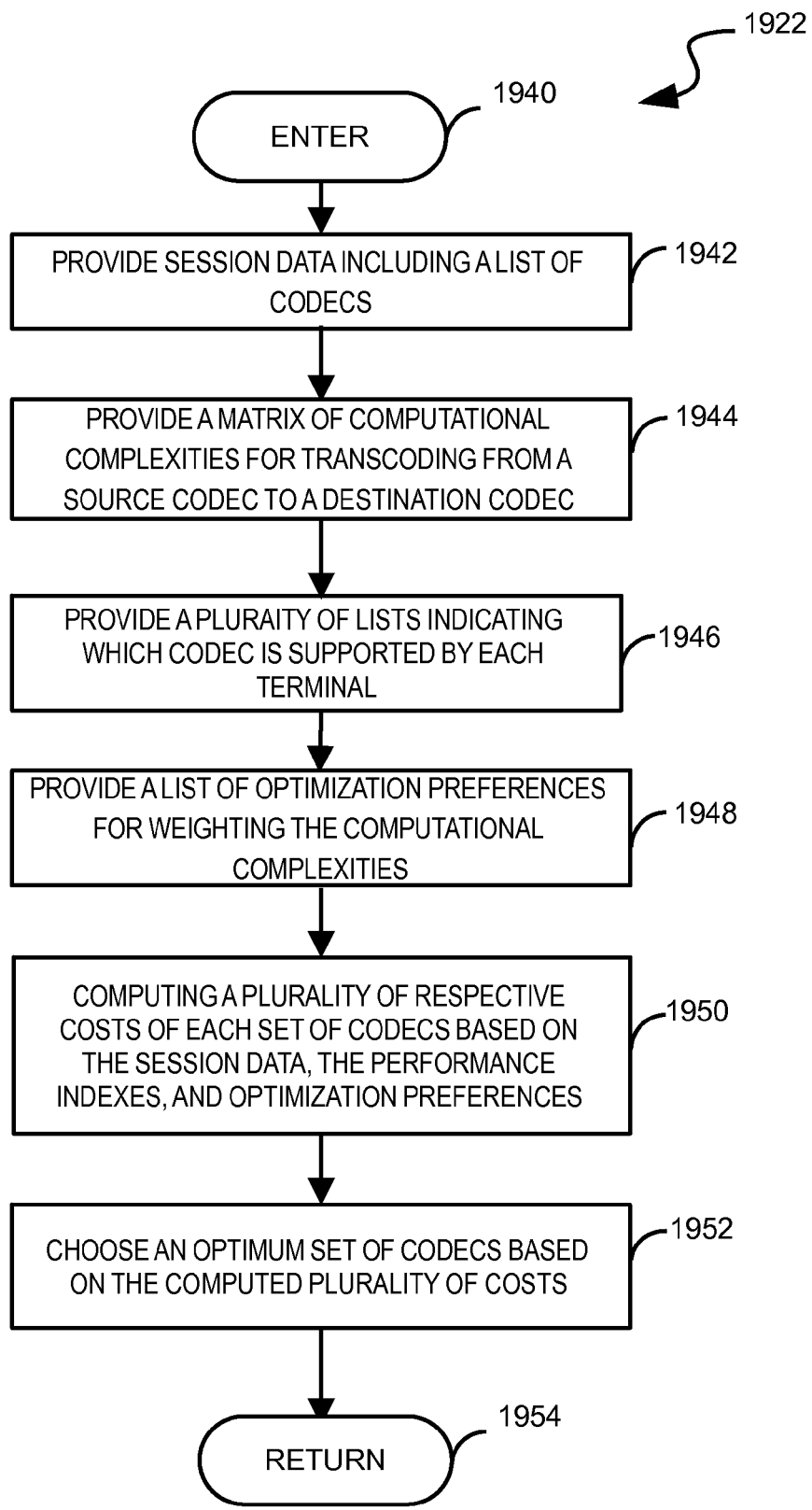
FIG. 6 is a flowchart of a step of choosing an optimal set of codecs shown in the flowchart of FIG. 5B.

Referring to FIG. 6 there is shown a flowchart of step 1922 in the flowchart of FIG. 5B. First a list of the possible codecs supported by the terminals $106_1$ to $106_n$ is provided. Then a matrix of computational complexities is provided 1944. Next a plurality of lists indicating which codec is supported by each terminal is provided 1946. Then a list of optimization preferences for weighting the computational complexities is provided 1948. Then using the list of codecs from step 1942, the matrix of computational complexities from step 1944, the plurality of lists of supported codecs from step 1946, and the list of optimization preferences from step 1948, compute, using the cost function generated in step 1920, a plurality of respective costs of each set of codecs. Finally, an optimum set of codecs is chosen 1952 based on a minimum cost computed in step 1950. Note, in preferred embodiments the optimum set of codecs is chosen 1952 based on a minimum cost computed in step 1950, however, in some alternative embodiments the optimum set of codecs may be chosen 1952 based on a maximum cost computed in step 1950.

The following Matlab code is an example embodiment in accordance with the flowchart 1922 shown in FIG. 6.

```
% Program to specify the supported codecs for each terminal and optimize
% resources
%
% Author : Stephane Coulombe
% stephane.coulombe@etsmtl.ca
%
% 2012-09-23
%
% List of possible codecs: AMR, EVRC, PCM, step 1942
codecname={'AMR' 'EVRC' 'PCM'};
% Complexity matrix to transcode from one codec to another T(source,dest), step 1944
% row is from, column is to.
complexity = [0 .4 .17; .5 0 .15; .3 .25 0]
% List of codecs supported by each terminal, step 1946
% Each row is a terminal and each column a flag indicating if he supports
% the codec
usercodec=[1 1 1; 1 0 0; 1 1 0; 0 1 1];
% step 1948, Optimization Parameters preset to unity.
dim = size(usercodec);
% Determine from the arrays, the number of terminals and codecs.
nbusers = dim(1)
nbcodecs = dim(2)
% Print the supported codecs for each terminal
fprintf(1,'\nSupported codecs by terminals\n')
for i=1:nbusers
    fprintf(1,'user %d : ',i)
    for j=1:nbcodecs
      if usercodec(i,j)
          fprintf(1,'%s ',codecname{j})
        end
    end
    fprintf(1,'\n')
end
fprintf(1,'\nComplexity Matrix\n')
complexity
% Set a counter to scan all possible combination of codecs that terminals can
% have. Start with each using the first codec.
codec = zeros(1,nbusers);
for i=1:nbusers
    codec(i)=1;
end
% optimal solution so far...
bestcodecs = codec;
bestA = 1e50;
fprintf(1,'\nList of possible solutions\n')
i=1;
while (i>=1) % While not all combinations have been covered, step 1950
    A=1e50;
    validcodecs=1;
    for i=1:nbusers
        validcodecs = validcodecs*usercodec(i,codec(i));
    end
    if (validcodecs)
        mat = zeros(1,nbcodecs);
        for i=1:nbusers
            mat(codec(i))=mat(codec(i))+1;
        end
        for ll=1:nbcodecs
            if mat(ll)==0
                mat(ll)=1;
            end
        end
        mat = 1./mat;
        A=0;
        for s=1:nbusers
```

-continued

```
            for d=1:nbusers
                A=A+mat(codec(d))*complexity(codec(s),codec(d))/nbusers;
            end
        end
        for i=1:nbusers
            fprintf(1,'user %d: %5.5s, ',i,codecname{codec(i)});
        end
        fprintf(1,'A = %f\n',A)
    end
%   step 1952
    if (A < bestA)
        bestA = A;
        bestcodecs = codec;
    end
    % Move to the next combination of codecs until all have been covered
    i = nbusers;
    carry=1;
                                % while there is a carry to make and not all
                                % terminals have been covered
    while(carry && i>=1)
        carry=0;                % No carry to the next terminal (stay with terminal i)
        codec(i)=codec(i)+1;    % go to the next codec of this terminal
        if codec(i) > nbcodecs     % if we have covered all the codecs
            codec(i)=1;            % start again from first
            carry=1;               % carry change to the next terminal
            i=i−1;
        end
    end
end
% Print the best solution
fprintf(1,'\nOptimal solution\n')
for i=1:nbusers
    fprintf(1,'user %d: %5.5s, ',i,codecname{bestcodecs(i)});
end
fprintf(1,'Aopt = %f\n',bestA)
```

When running the program with the previous parameters:

```
Supported codecs by terminals
user 1 : AMR EVRC PCM
user 2 : AMR
user 3 : AMR EVRC
user 4 : EVRC PCM
Complexity Matrix
complexity =
         0    0.4000    0.1700
    0.5000         0    0.1500
    0.3000    0.2500         0
List of possible solutions
user 1:    AMR, user 2:   AMR, user 3:   AMR, user 4:   EVRC, A = 0.425000
user 1:    AMR, user 2:   AMR, user 3:   AMR, user 4:    PCM, A = 0.202500
user 1:    AMR, user 2:   AMR, user 3:  EVRC, user 4:   EVRC, A = 0.450000
user 1:    AMR, user 2:   AMR, user 3:  EVRC, user 4:    PCM, A = 0.585000
user 1:   EVRC, user 2:   AMR, user 3:   AMR, user 4:   EVRC, A = 0.450000
user 1:   EVRC, user 2:   AMR, user 3:   AMR, user 4:    PCM, A = 0.585000
user 1:   EVRC, user 2:   AMR, user 3:  EVRC, user 4:   EVRC, A = 0.475000
user 1:   EVRC, user 2:   AMR, user 3:  EVRC, user 4:    PCM, A = 0.605000
user 1:    PCM, user 2:   AMR, user 3:   AMR, user 4:   EVRC, A = 0.585000
user 1:    PCM, user 2:   AMR, user 3:   AMR, user 4:    PCM, A = 0.235000
user 1:    PCM, user 2:   AMR, user 3:  EVRC, user 4:   EVRC, A = 0.605000
user 1:    PCM, user 2:   AMR, user 3:  EVRC, user 4:    PCM, A = 0.580000
Optimal solution
user 1:    AMR, user 2:   AMR, user 3:   AMR, user 4:    PCM, Aopt = 0.202500
```

While example embodiments of the cost function have been presented for equations 1, 4-7 shown above, it is understood that various other cost functions, optimizing various parameters of a communication session between multiple terminals, can be also built.

In any optimization problem, such as this one, it is crucial to properly set the desired cost function, as it will influence the overall performance of the system that it is desired to optimize. For instance, if it is desired want to minimize a computational complexity of the communication session, which is mainly due to the transcoding operations performed within the system as a consequence of the set of selected media codecs, it is appropriate to use a cost function that will take into account the computational complexity of each transcoding operation performed to ensure interoperability between terminals for that set of selected media codecs in the system. Such cost function will provide, for each possible choice of media codecs for the terminals in the session a cost associated with that media codecs choice. The goal of the optimization operation is to select the set of media codecs, which will optimize the cost function (minimize or maximize it depending on what it is desired to optimize). For instance, if it is desired to minimize the computational complexity of the communication system, a cost function can be derived comprised of the sum of the computational complexities of each transcoding operation performed by the transcoder for any set of codecs, and select the set of codecs that minimize the cost function. The cost function can be any function of the set of media codecs used in the multi-terminal communication session measuring or estimating one performance aspect of the communication system or a combination of several performance aspects of the communication system. Performance aspects include but are not limited to: a computational complexity for transcoding in the transcoder, computational complexity for coding/decoding media streams in the terminals, computational complexity in the communication system, energy consumption in the transcoder, energy consumption in the terminals, energy consumption in the communication system, memory usage in the transcoder/terminal/communication system, bandwidth usage in the communication system, battery usage of the terminals, audiovisual quality of the system.

An example embodiment of the cost function used in steps 1920, 1922, and 1924 is as follows. We define the following variables:

N: number of terminals in a session.

C(i): codec used by terminal i (associated with terminal i) in a session.

card(C): numbers of terminals in the session using the codec C.

$T(c_s,c_d)$: computational complexity value or estimate for transcoding from source codec $c_s$ to destination codec $c_d$, with the constraint that $T(C,C)=0$ (as no transcoding is needed). If T(a,b) is not supported by the transcoding server for a pair of codecs a and b, then T(a,b) is set to infinity (or a very large value).

$\alpha_i$: proportion of the time terminal i talks compared to the other terminals (for example: may represent a percentage).

An average complexity associated with transcoding operations in the communication session can be expressed, for example, as shown below using a sample cost function "A":

$$A = \sum_{s=1}^{N}\sum_{d=1}^{N}\left(\frac{1}{\text{card}(C(d))}\right)\alpha_s T(C(s), C(d)) \qquad \text{(eq. 1)}$$

In general, embodiments of the present invention may have a term $T_X(C(s),C(d))$ in equation 1 instead of the term $T(C(s),C(d))$ as shown above wherein a value of x is predetermined to be unity. For example, the value x may be predetermined to be 2 to provide alternative weighting properties.

In the above equation (1), the term $1/\text{card}(C(d))$ is used to take into account that if it is needed to transcode from source s to destinations $d_1$ and $d_2$ having the same codec, the transcoding complexity only needs to be counted once, or equivalently, both transcodings can be counted but with a weight of ½ as shown in the equation (1).

If the respective proportions of time that terminals talk $\alpha_i$ are not known, it can assumed that each terminal talks the same proportion of the time and therefore:

$$\alpha_i = \frac{1}{N}, \forall i \qquad \text{(eq. 2)}$$

We need to find a combination of codecs C(i) for all terminals that minimizes the cost function A.

Note that C(i) needs to be supported by terminal i, for each i. Several terminals may have the same codec, which is desirable as it will help to minimize the cost function A.

Conveniently, T(C,C) is set to zero as no transcoding is required when no codec conversion is needed. However, it is understood that it is possible to use a non-zero weight for T(C,C), but then the formulae need to be modified to take into account the fact that 1/card(C(d)) would count the source in such case and will need to be also modified; also d=s should be removed in the second summation in equation (1).

Formally, the optimal codec values and optimal cost function A can be founds as follows:

$$C^* = (C^*(1), C^*(2), \ldots, C^*(N)) \qquad \text{(eq. 3)}$$

$$= \underset{\substack{C=(C(1),C(2),\ldots,C(N))\\ \text{with } C(i)\in S(i), \forall 1\leq i\leq N}}{\text{argmin}} \sum_{s=1}^{N}\sum_{d=1}^{N}\left(\frac{1}{\text{card}(C(d))}\right)\alpha_s T(C(s), C(d))$$

$$A^* = \sum_{s=1}^{N}\sum_{d=1}^{N}\left(\frac{1}{\text{card}(C^*(d))}\right)\alpha_s T(C^*(s), C^*(d))$$

where C is a vector containing the codecs of each terminal, C* is the vector containing the optimal codecs, and S(i) is the set of codecs supported by terminal i.

Note that $T(C_s,C_d)$ can be obtained experimentally by measuring the time it takes to convert some media content from codec $C_s$ to codec $C_d$.

Figure 7:
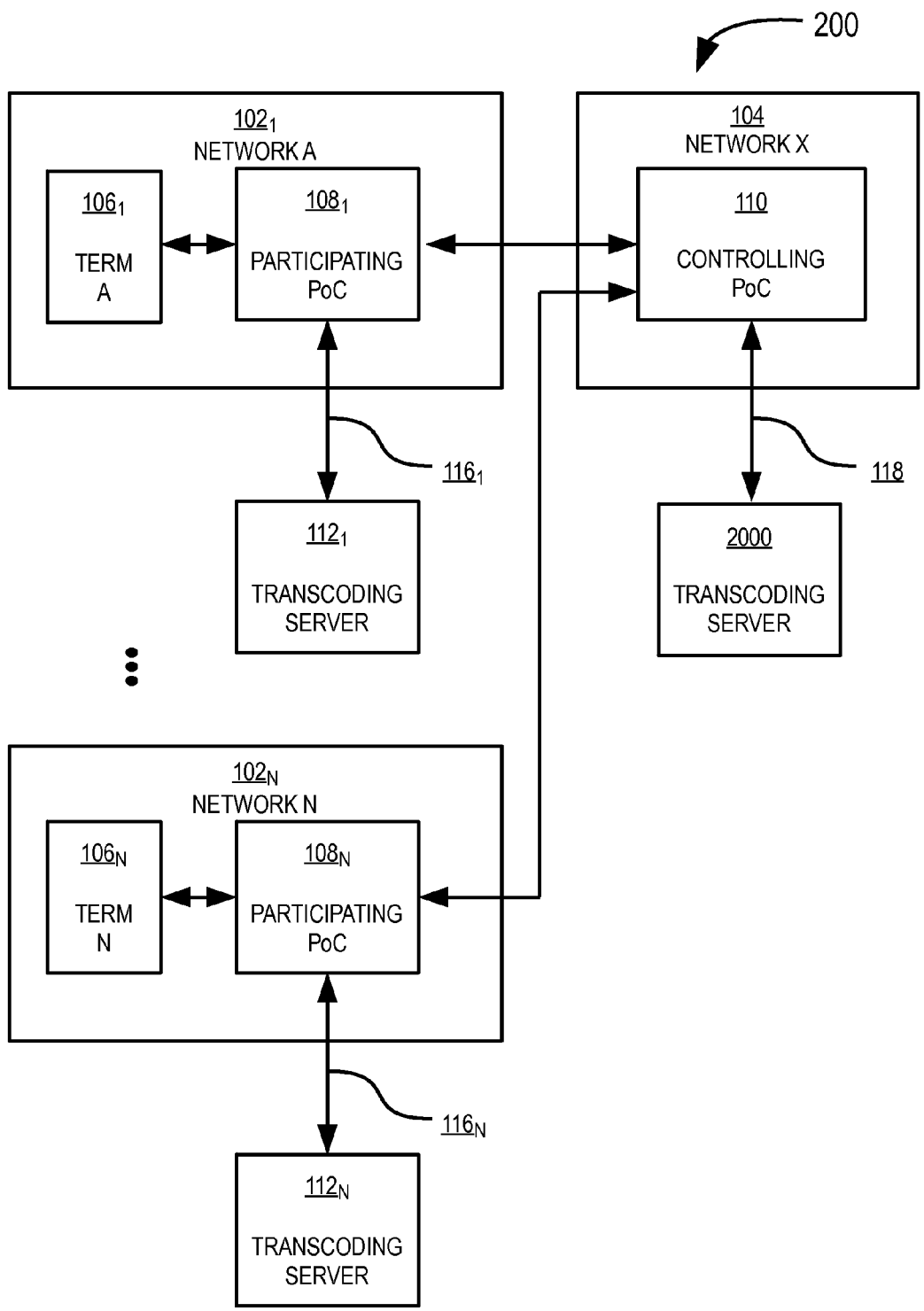
FIG. 7 is a block diagram of a Push-to-talk over Cellular (PoC) communication system in accordance with another embodiment of the present invention.

The second example embodiment will now be described with reference to FIG. 7 which illustrates a system 200, which is a generalized version the system 100 of FIG. 1. The Transcoding Server 1600 of FIG. 1 has been replaced by an alternative embodiment Transcoding server 2000.

Figure 8:
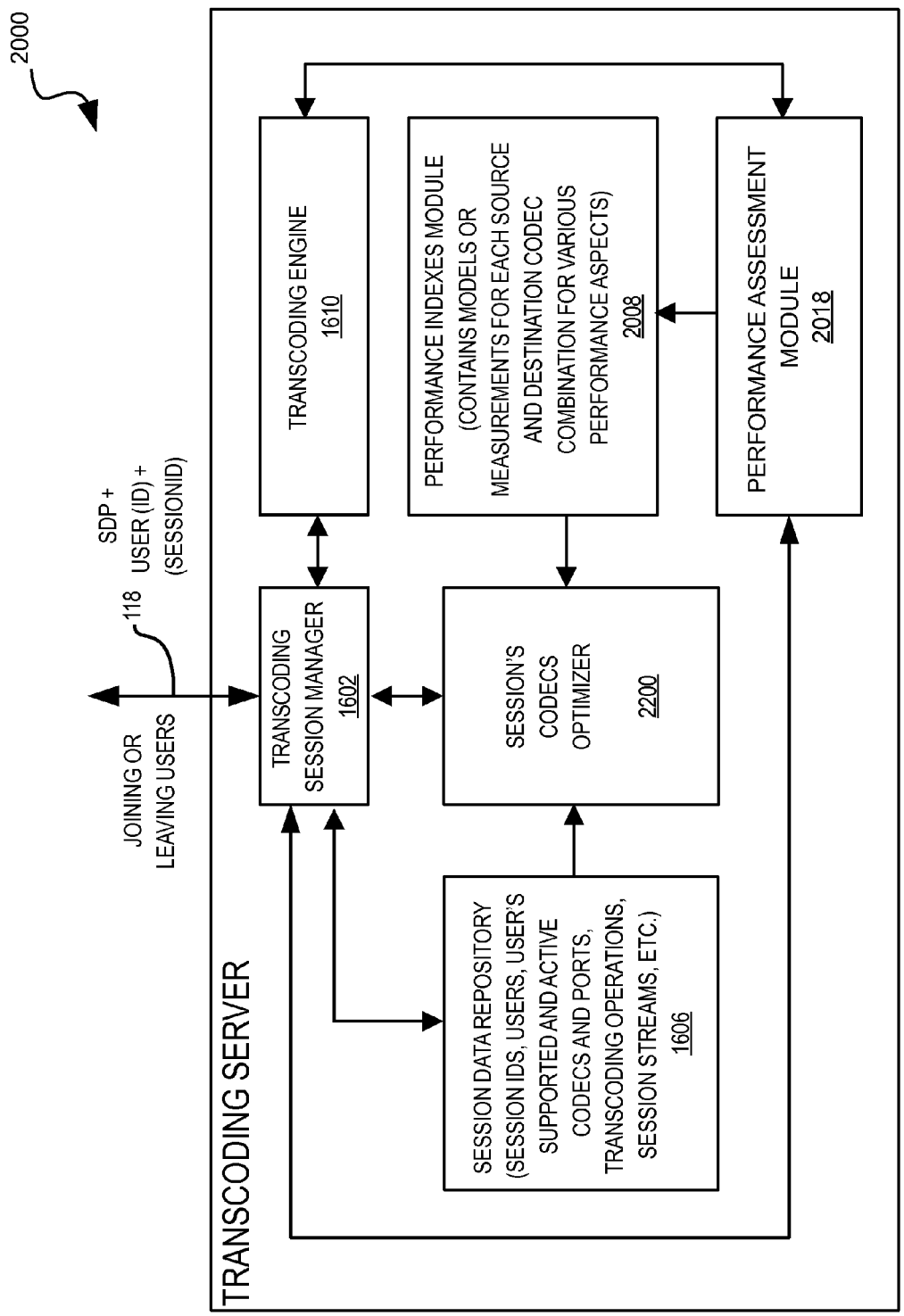
FIG. 8 is a block diagram of an embodiment of a transcoding server shown in FIG. 7.

Referring next to FIG. 8, there is shown a block diagram of the Transcoding Server 2000. The Computational Complexity Module 1608 of FIG. 2 has been replaced by a Performance Indexes Module 2008, which contains models or measurements for each source and destination codec combination for various performance aspects of the system 200. The Transcoding Server 2000 also includes a Performance Assessment Module 2018, which performs empirical measurements, either off-line or in real-time of various performance indexes as well as other measurements on the current media session. To perform off-line measurements, the Performance Assessment Module 2018, may request the Transcoding Engine 1610 to perform some transcoding operations (from the audio-visual database), measure performance indexes and return the results. Alternatively, the Performance Assessment Module 2018 may perform the measurements itself while the Transcoding Engine 1610 is performing transcoding. The Performance Assessment Module 2018 processes the results and provides performance indexes to the Module 2008. The Performance Assessment Module 2018 also informs the Transcoding Session Manager 1602 if a performance problem has occurred or if the real-time measurements have changed significantly the values of the performance indexes (or other special circumstances have occurred), and better system performance can be achieved by modifying the current codecs.

Figure 9A:
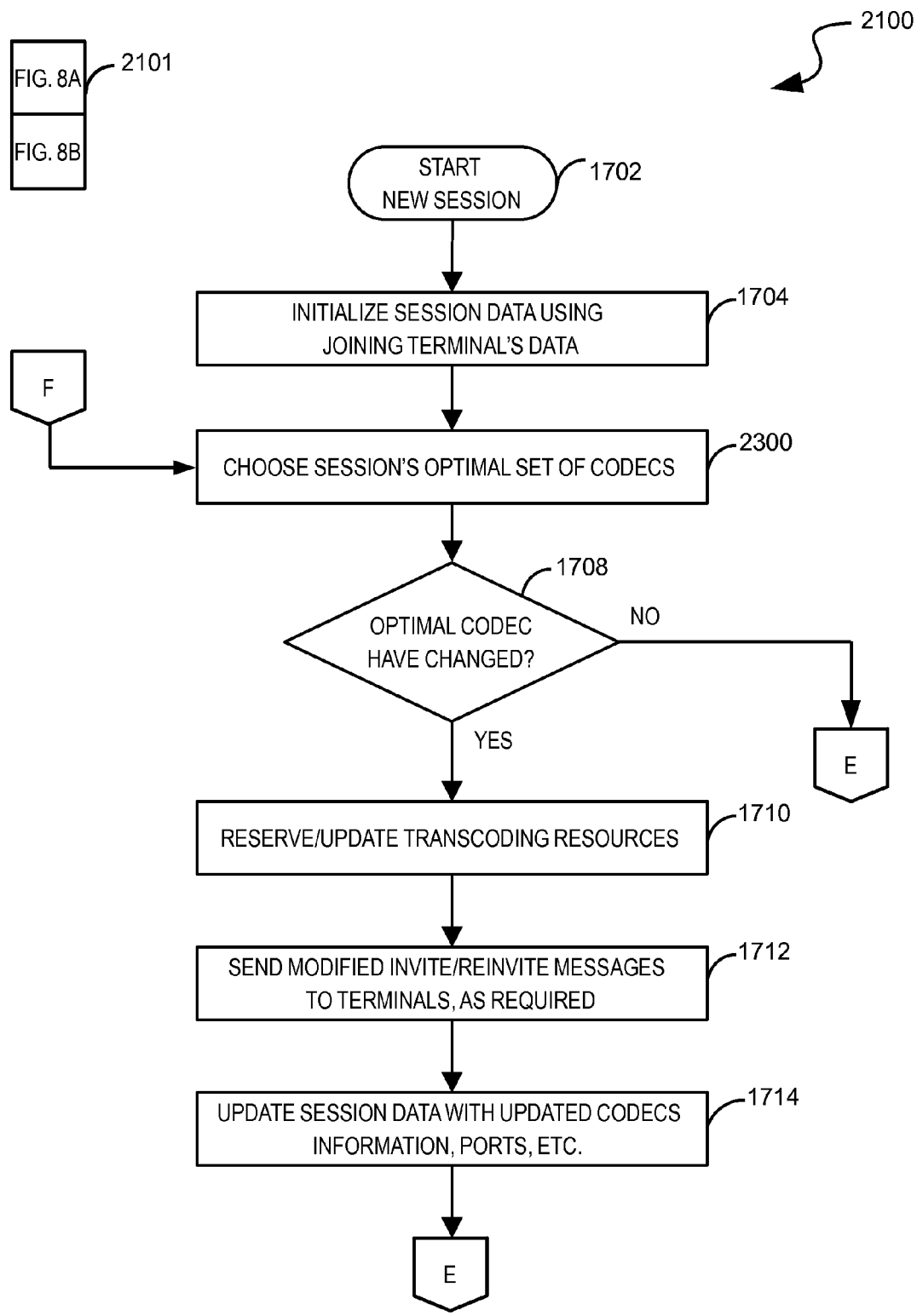
FIGS. 9A and 9B show a flowchart of a method for managing a transcoding session performed by the transcoding server shown in FIG. 8.
Figure 9B:
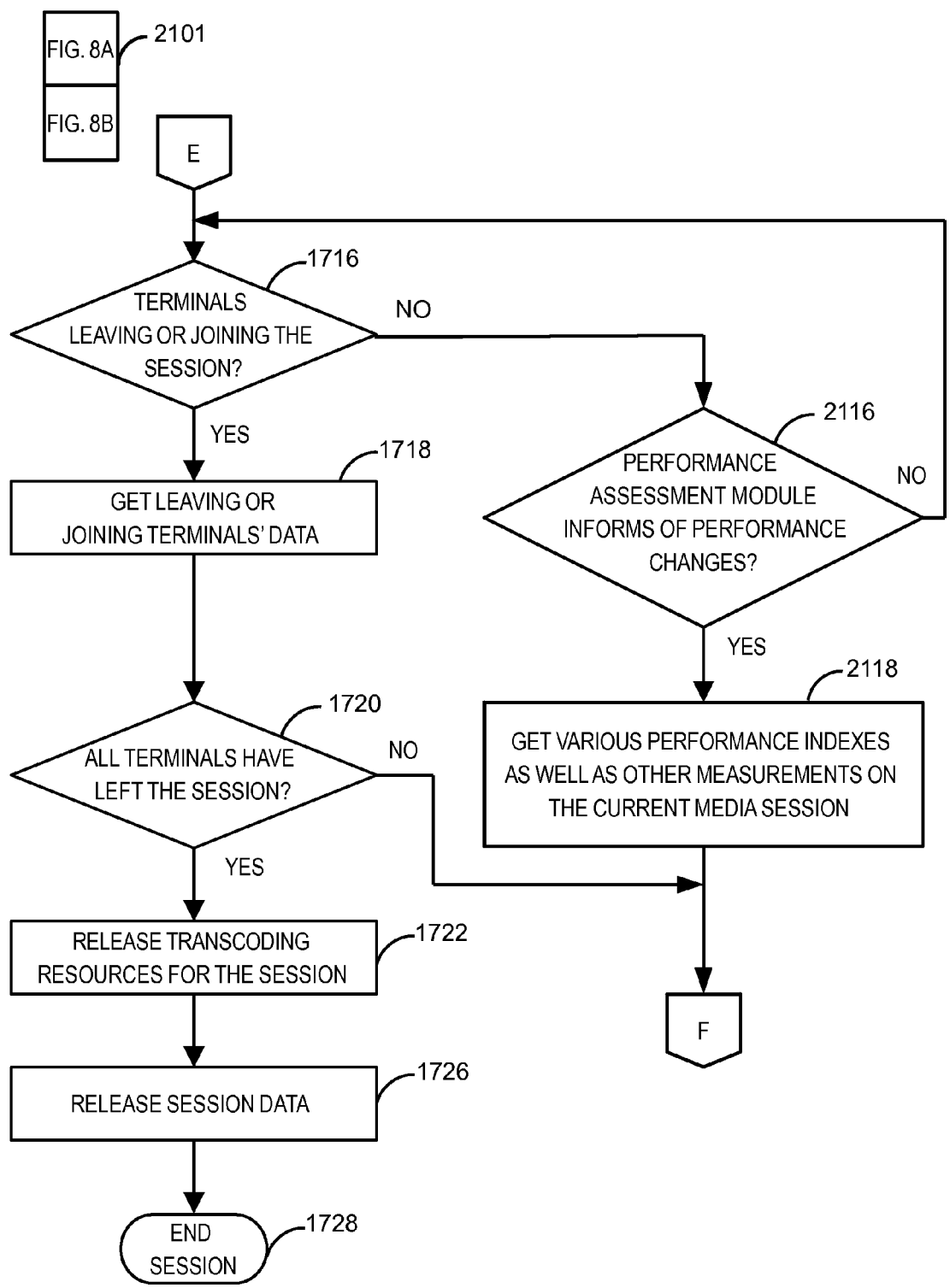

FIGS. 9A and 9B show a flowchart of a method 2100 which is a generalized version of the method 1700 of the flowchart in FIGS. 3A and 3B. A legend 2101 shows an arrangement of FIGS. 9A and 9B.

The steps of the method 2100 of FIGS. 9A and 9B are similar to the steps of the method 1700 of FIGS. 3A and 3B. The exceptions are addition of steps 2116 and 2118; and step 1900 has been replaced by step 2300.

In the method 2100, when there are no terminals leaving or joining the session in step 1716, the process continues to step 2116 where the Performance Assessment Module 2018 of FIG. 8 may inform the Transcoding Session Manager 1602 of FIG. 8 that performance changes have occurred (in other words various performance related problems or changes in the performance indexes have occurred) and that modifications to the transcoding session may be required. If the Performance Assessment Module need to inform the Transcoding Session Manager 1602 of performance changes, the method 2100 exits 'Yes' from step 2116 and obtains various performance indexes as well as other measurements on the current media session 2118. Otherwise the step 2116 exits 'No' from step 2116 and loops back to the input of step 1716 to check whether terminals are leaving or joining the session. From step 2118, it is looped back to step 2300 to determine the session's optimal set of codecs using the Session Codecs Optimizer 2200 based on the information obtained from step 2118. Step 2300 is described herein below with regard to FIGS. 10, 11A, and 11B.

Figure 10:
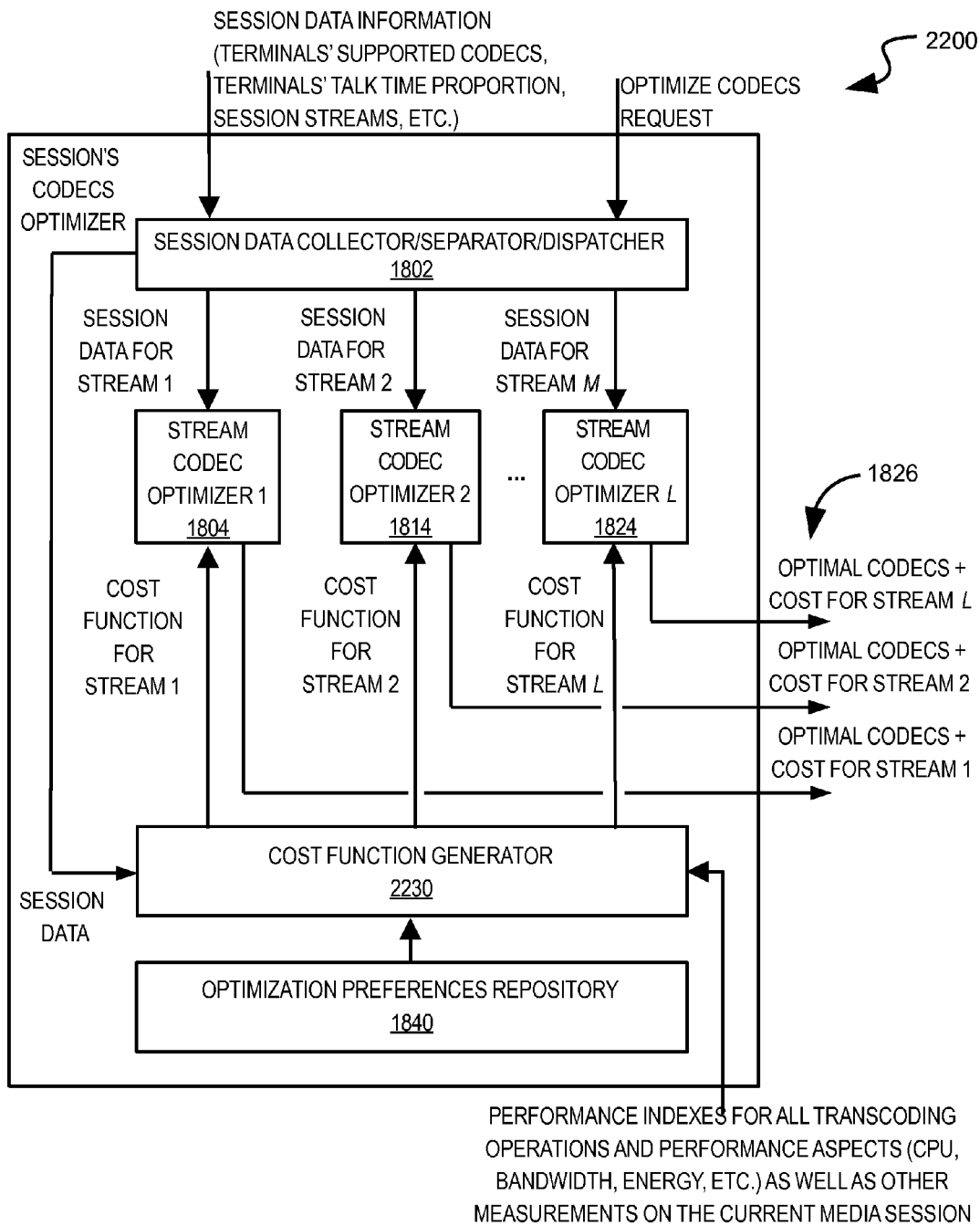
FIG. 10 is a block diagram of a Session Codecs Optimizer shown in FIG. 8.

FIG. 10 is a block diagram of a Session's Codecs Optimizer 2200, which is a generalized version the Session's Codecs Optimizer 1800 of FIG. 4. (Original) The Cost Function Generator 2230 takes performance indexes for transcoding operations and performance aspects (CPU, bandwidth, energy, or the like) as well as other measurements on the current media session to generate a cost function for each media stream.

Figure 11A:
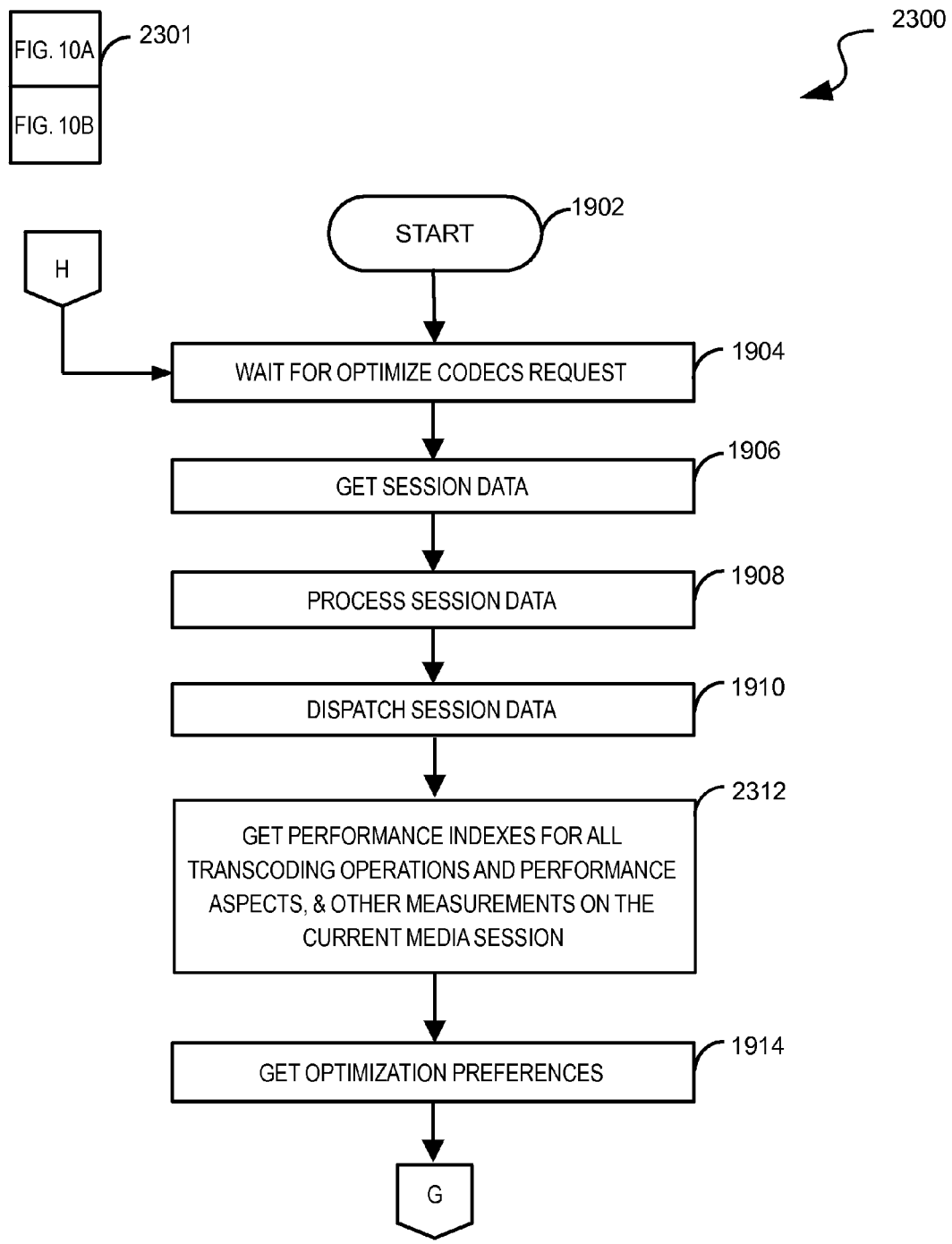
FIGS. 11A and 11B show a flowchart of a method for optimizing a measure of performance of a transcoding session performed by the Session Codec Optimizer shown in FIG. 10.
Figure 11B:
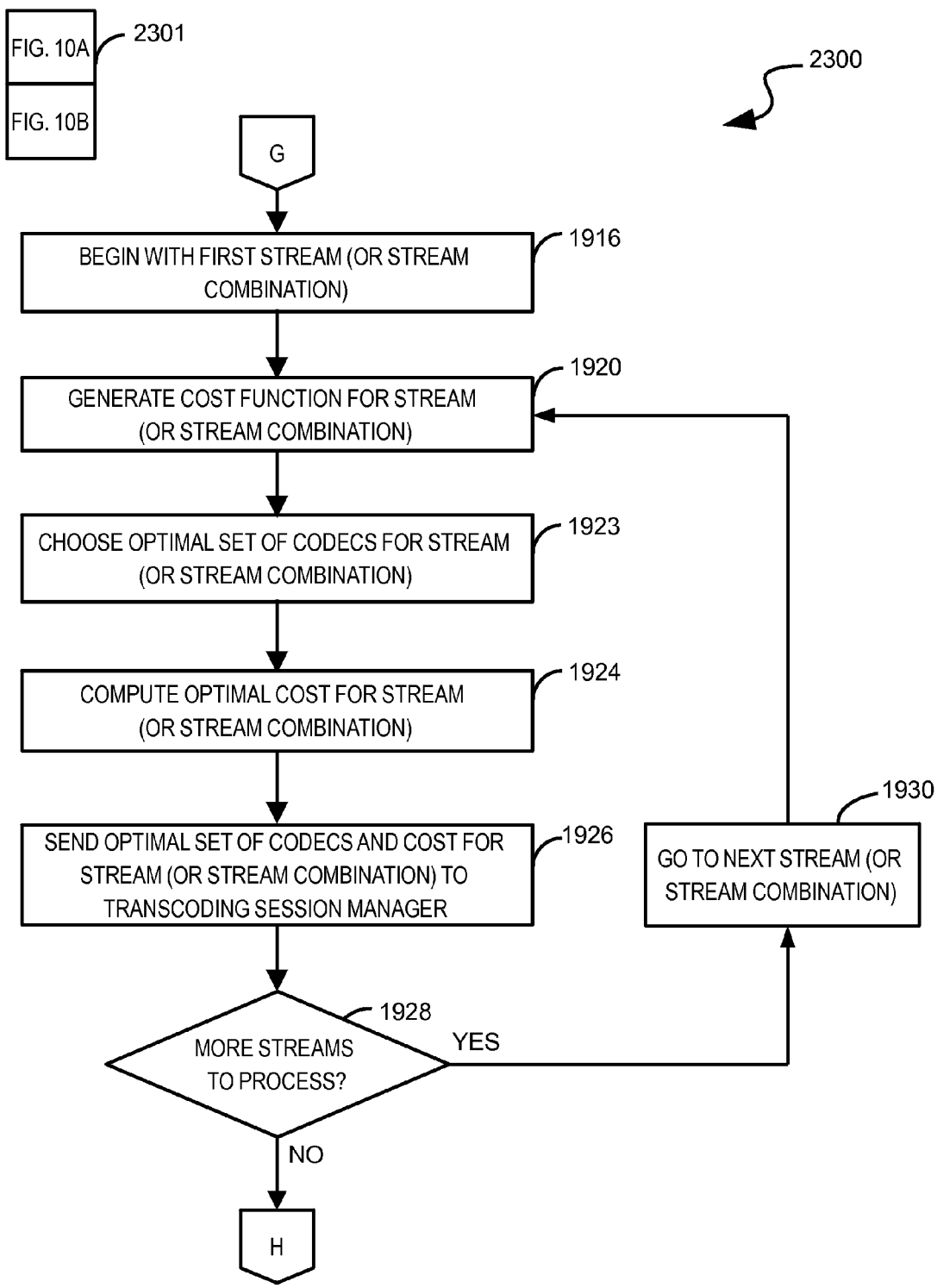

FIGS. 11A and 11B show a flowchart of a method 2300, which is a generalized version the of the method 1900 of the flowchart in FIGS. 5A and 5B. A legend 2301 shows an arrangement of FIGS. 11A and 11B.

The step 1912 of method 1900 is replaced by step 2312, which gets performance indexes for transcoding operations and performance aspects, as well as other measurements on the current media session. Note that step 1904 which waits for an optimize codec request remains unchanged but the requests may be due performance changes in the session in addition to terminals joining or leaving the session. Example embodiments of the cost function used in steps 1920, 1923, and 1924 are described in more detail herein below.

Figure 12:
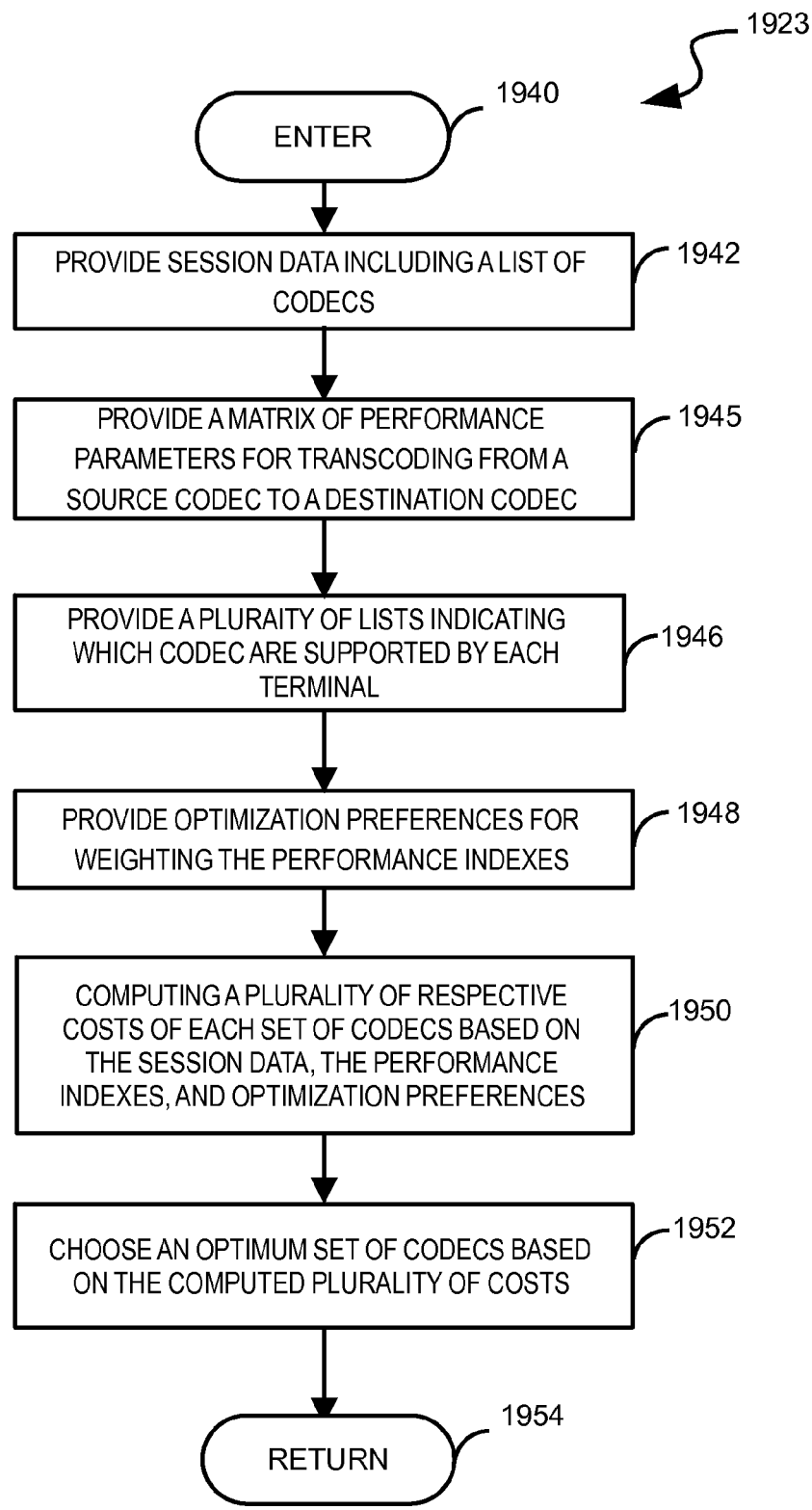
FIG. 12 is a flowchart of a step of choosing an optimal set of codecs shown in the flowchart of FIG. 11B.

Referring to FIG. 12 there is shown a flowchart of step 1923 in the flowchart of FIG. 11B. First a list of the possible codecs supported by the terminals $106_1$ to $106_N$ is provided. Then a matrix of performance indexes is provided 1945. Next a plurality of lists indicating which codec is supported by each terminal is provided 1946. Then a list of optimization preferences for weighting the performance indexes is provided 1948. Then using the list of codecs from step 1942, the matrix of performance indexes from step 1945, the plurality of lists of supported codecs from step 1946, and the list of optimization preferences from step 1948, compute, using the cost function generated in step 1920, a plurality of respective costs of each set of codecs. Finally, an optimum set of codecs is chosen 1952 based on a minimum cost computed in step 1950.

The following is a description of example embodiments of the cost function used in steps 1920, 1922, and 1924 of the flowcharts 1900 (FIGS. 5A and 5B) and 2300 (FIGS. 11A and 11B). Determining the cost function provides the basis for choosing media codecs in a multi-terminal communication session involving two or more terminals to optimize the transcoding operations, affecting the performance of the communication system 100,200.

For instance, a computational complexity, energy consumption, bandwidth usage can be optimized using the approach of the embodiments of the invention.

It is also possible to develop other, more complicated cost functions to optimize transcoding resources or other resources of multi-terminal communication system, for example bandwidth usage, by taking into account multiple streams jointly. Again, the cost function can be general and cover various optimization cases such as generalize multidimensional optimization (optimize audio and video codecs for combinations of performance aspects of the system, with various importance or weights for each performance aspect or media codec type, for example, audio versus video, or each media codec type optimizing a different performance aspect), unconstrained versus constrained optimization (for example, it is desired that the power consumption, computational complexity or bandwidth to be below a certain value, and optimize other performance aspects), or the like.

It is also understood that $T(C_s,C_d)$ may be replaced by any measure of complexity that needs to be optimized in the system supporting the multi-terminals session, including but not limited to: computational complexity, computation time, energy consumption, bandwidth usage, memory usage, or the like, as described below with regard to the second embodiment. Since their global influence on the overall system performance is additive (in other words, the total computational complexity is the sum of individual computations), the cost function in the example above is also additive (weighted sum of the $T(C_s,C_d)$). However, as mentioned, the cost function can be any function of the set of media codecs used in the multi-terminal communication session measuring or estimating one performance aspect of the communication system or a combination of several performance aspects of the communication system. The performance aspect may relate to various parts of the communication system including, but not limited to, the transcoding server, the terminals, the communication network and any combination of them. To give an example of other types of possible functions, let's consider it is desired to optimize the visual quality of the system, it may be desirable to use a product rather than a sum to highly penalize a poor visual quality in the system rather than allowing it as long as the overall sum is optimal (in other words, with the sum, a solution might be selected where the quality at one terminal is extremely poor while the quality at others is very good, with the product the quality will be more balanced among the terminals). For instance, the following variables and cost function for visual quality may be used:

N: number of terminals in a session.

C(i): codec used by terminal i (associated with terminal i) in a session.

$V(c_s,c_d)$: value or estimate of the visual quality between 0 and 1 (0 being extremely poor and 1 being perfect) for transcoding from source codec $c_s$ to destination codec $c_d$, with the constraint that $V(C,C)=1$ (as no transcoding is needed). If $V(a,b)$ is not supported by the transcoding server for a pair of codecs a and b, then $V(a,b)$ is set to zero. The quality measures $V(c_s,c_d)$ may be obtained experimentally by transcoding, typically off-line, a set of videos using source codec $c_s$ to destination codec $c_d$, and measuring the quality on a scale of 0 to 1 using a visual quality metric such as the Structural Similarity (SSIM) between the transcoded content and the source.

Note that as an implementation detail, it may be decided to use a fixed destination bitrate or to set the destination bitrate the same as the source bitrate (or a constant multiplied by the source bitrate, or the like) to establish the quality. Someone skilled in the art of video processing will know how to conduct such experiments.

A global visual quality associated with transcoding operations in the communication session can be expressed, for example, as shown below using a sample cost function "$A_v$":

$$A_v = \prod_{s=1}^{N}\prod_{d=1}^{N} V(C(s), C(d)) \quad \text{(eq. 1b)}$$

Again, the cost function may take other forms beyond the sum and product and may include powers and other mathematical functions as well as their combinations. Often the performance that it is desired to optimize will dictate the best mathematical form (sum as in the case of power consumption, product for visual quality, or the like). The cost function may come from a model or empirical measurements (for example: the computational complexity or power associated with the transcoding from a source to a destination codec). Each model or measurement associated with a source and a destination codec for a specific performance aspect of the system is called: performance index (for example: $V(c_s,c_d)$ is the performance index for source codec $c_s$ and destination codec $c_d$ for visual quality; $T(c_s,c_d)$ is the performance index for source codec $c_s$ and destination codec $c_d$ for the computational complexity). A cost function is a function of various performance indexes, which are in turn function of source and destination codecs (and possibly some operating parameters). The cost function can incorporate measures of performance of the transcoding session (for example: computational complexity) or normalized values. The empirical measurements are performed in a performance assessment module 2018 (FIG. 8) which can operate off-line as well as in real-time. The measurements of various performance indexes can be performed off-line using common operational scenarios using various codecs. For instance, the power consumption can be measured when transcoding from source codec $c_s$ to destination codec $c_d$ as a function of specific operational parameters when known (for example: if bitrate, resolution, or the like are known) or using typical operational parameters when they are unknown. To measure power consumption, devices exist that can be placed between a computer and the power source to measure energy and power consumption. These measurements are made using a database of audio-visual media clips representative of those exchanged during media sessions. Similarly, computational complexity in number of cycles or CPU time can be measured as well as memory usage, audio-visual quality, bandwidth usage, or the like. The performance assessment module can also operate in real-time and gather some measurements on the current media session (performance indexed pertaining to power consumption, computational complexity, bandwidth usage) and combine those results with those obtained off-line (for example: weighting the results of the two with weights on the real-time results that increase with time). The measurements can be used to conceive more complex mathematical models for the cost function that will incorporate various combinations of performance indexes of the communication system, in other words, the measure of performance to be optimized can be a combination of several properties/aspects of the transcoding session (for example, a compromise between energy consumption, computational complexity and bandwidth usage, or a compromise between visual quality and power consumption, or the like).

The complexity $T(C_s,C_d)$ can represent an absolute complexity measure, for example an actual processing time, or a relative measure, for example comparing the relative complexity of one transcoding operation with respect to the others.

As an example of combining several properties/aspects, the CPU (represented by $T_{CPU}(C_s,C_d)$) and the bandwidth (represented by $T_{BW}(C_s,C_d)$) can be Combined as:

$$C^* = (C^*(1), C^*(2), \ldots, C^*(N)) \quad \text{(eq. 4)}$$

$$= \underset{\substack{C=(C(1),C(2),\ldots,C(N)) \\ \text{with } C(i) \in S(i), \forall 1 \le i \le N}}{\operatorname{argmin}} \sum_{s=1}^{N}\sum_{d=1}^{N}\left(\frac{\alpha_s}{\operatorname{card}(C(d))}\right)$$

$$(\beta_{CPU}T_{CPU}(C(s), C(d)) + \beta_{BW}T_{BW}(C(s), C(d)))$$

$$A^* = \sum_{s=1}^{N}\sum_{d=1}^{N}\left(\frac{\alpha_s}{\operatorname{card}(C^*(d))}\right)$$

$$(\beta_{CPU}T_{CPU}(C^*(s), C^*(d)) + \beta_{BW}T_{BW}(C^*(s), C^*(d)))$$

where $\beta_{CPU}$ and $\beta_{BW}$ are the weights allocated to CPU and bandwidth respectively.

The above equations (1)-(4) apply to one media stream, for example, an audio or a video stream, but it is understood that they could be applied to multiple streams.

For instance, in the case where the session includes an audio and a video streams, the codec selection process described above can be applied to each stream individually. For instance, if there is no constraint forcing the audio and video streams to be optimized jointly, then each stream can be individually optimized as follows:

$$C^*_{audio} = (C^*_{audio}(1), C^*_{audio}(2), \ldots, C^*_{audio}(N)) \quad \text{(eq. 5)}$$

$$= \underset{\substack{C_{audio}=(C_{audio}(1),C_{audio}(2),\ldots,C_{audio}(N)) \\ \text{with } C_{audio}(i) \in S_{audio}(i), \forall 1 \le i \le N}}{\operatorname{argmin}}$$

$$\sum_{s=1}^{N}\sum_{d=1}^{N}\left(\frac{1}{\operatorname{card}(C_{audio}(d))}\right)\alpha_s T_{audio}(C_{audio}(s), C_{audio}(d))$$

$$A^*_{audio} = \sum_{s=1}^{N}\sum_{d=1}^{N}\left(\frac{1}{\operatorname{card}(C^*_{audio}(d))}\right)\alpha_s T_{audio}(C^*_{audio}(s), C^*_{audio}(d))$$

where $C_{audio}$ is a vector containing the audio codecs of each terminal ($C_{audio}(i)$ is the codec used by terminal i), $C^*_{audio}$ is the vector containing the optimal audio codecs, $S_{audio}(i)$ is the set of audio codecs supported by terminal i, and $T_{audio}(c_s,c_d)$ the computational complexity value or estimate for transcoding from audio codec $C_s$ to audio codec $C_d$.

$$C^*_{video} = (C^*_{video}(1), C^*_{video}(2), \ldots, C^*_{video}(N)) \quad \text{(eq. 6)}$$

$$= \underset{\substack{C_{video}=(C_{video}(1),C_{video}(2),\ldots,C_{video}(N)) \\ \text{with } C_{video}(i) \in S_{video}(i), \forall 1 \le i \le N}}{\operatorname{argmin}}$$

$$\sum_{s=1}^{N}\sum_{d=1}^{N}\left(\frac{1}{\operatorname{card}(C_{video}(d))}\right)\alpha_s T_{video}(C_{video}(s), C_{video}(d))$$

$$A^*_{video} = \sum_{s=1}^{N}\sum_{d=1}^{N}\left(\frac{1}{\operatorname{card}(C^*_{video}(d))}\right)\alpha_s T_{video}(C^*_{video}(s), C^*_{video}(d))$$

where $C_{video}$ is a vector containing the video codecs of each terminal ($C_{video}(i)$ is the codec used by terminal i), $C^*_{video}$ is the vector containing the optimal video codecs, $S_{video}(i)$ is the set of video codecs supported by terminal i, and $T_{video}(c_s,c_d)$ the computational complexity value or estimate for transcoding from video codec $C_s$ to video codec $C_d$.

In some circumstances, it is possible that audio and video streams may have to be optimized jointly, for instance, if the selection of a video codec in a terminal limits the selection of the supported audio codecs.

This can happen if a terminal supports H.264 and H.263 video codecs (International Telecommunications Union (ITU) video codec standards), and AMR (Adaptive Multi-Rate), G711 (ITU audio companding standard), and MPEG-4 AAC (Advanced Audio Codec, International Standards Organization (ISO) standard) audio codecs but the terminal software would not support the playback of H.263 and MPEG-4 AAC together. In such case, only certain combinations of audio and video codecs would be possible.

Then, the optimal solution for codecs and the cost function using joint constraints on two media streams can be expressed as follows:

$$C^* = (C^*_{audio}(1), C^*_{audio}(2), \ldots, C^*_{audio}(N), C^*_{video}(1), C^*_{video}(2), \ldots, C^*_{video}(N)) \quad \text{(eq. 7)}$$

$$= \underset{\substack{C=(C_{audio}(1),C_{audio}(2),\ldots,C_{audio}(N),C_{video}(1),C_{video}(2),\ldots,C_{video}(N)) \\ \text{with } (C_{audio}(i),C_{video}(i))\in J(i), \forall 1\leq i\leq N}}{\operatorname{argmin}} \sum_{s=1}^{N}\sum_{d=1}^{N} \alpha_s$$

$$\left[\left(\frac{1}{\operatorname{card}(C_{audio}(d))}\right)T_{audio}(C_{audio}(s), C_{audio}(d)) + \left(\frac{1}{\operatorname{card}(C_{video}(d))}\right)T_{video}(C_{video}(s), C_{video}(d))\right]$$

$$A^* = \sum_{s=1}^{N}\sum_{d=1}^{N} \alpha_s \left[\left(\frac{1}{\operatorname{card}(C^*_{audio}(d))}\right)T_{audio}(C^*_{audio}(s), C^*_{audio}(d)) + \left(\frac{1}{\operatorname{card}(C^*_{video}(d))}\right)T_{video}(C^*_{video}(s), C^*_{video}(d))\right]$$

where $J(i)$ is, for all $1\leq i\leq N$, the set of all vectors of the form $(J_{audio}(i), J_{video}(i))$ representing combinations of media streams that are supported by the terminal i. It is assumed that $J_{audio}(i) \in S_{audio}(i)$ and that $J_{video}(i) \in S_{video}(i)$.

It is also contemplated that the equations (5-7) can be further generalized to take into account multiple constrained media streams and combinations of unconstrained and constrained media streams.

When considering streams jointly, it is important that the computational complexity values ($T(c,d)$) for the various streams be expressed on a comparable scale, that is: normalized.

For example, in the case of audio and video streams, if computational complexity is minimized, it is important that they represent the computational complexities corresponding to comparable transcoding scales, such as the complexity of transcoding audio and video streams for the same duration of the media streams.

Take for instance, the case where it takes 1 ms to transcode a 20 ms audio frame from AMR to EVRC, and 10 ms to transcode a video frame from H.264 to H.263 at a frame rate of 30 fps. Then it would take 50 ms to transcode 1 s of audio and 300 ms to transcode 1 s of video. Therefore, $T_{audio}(\text{AMR}, \text{EVRC})=50$ and $T_{video}(\text{H.264},\text{H.263})=300$ should be used to express the transcoding complexities on a comparable scale.

Below are a few concrete examples of optimizing the codecs and the cost function shown in equation (1) above.

Let's assume that there are four terminals in a session. The codecs that are respectively supported by the terminals are as follows:

$S(1)=\{\text{AMR},\text{EVRC},\text{PCM}\}$, $S(2)=\{\text{AMR}\}$, $S(3)=\{\text{AMR}, \text{EVRC}\}$, $S(4)=\{\text{EVRC},\text{PCM}\}$ Let us suppose that the relative computational complexity required to transcode each pair of codecs is as follows (the numbers are only illustrative):
$T(\text{AMR},\text{AMR})=T(\text{PCM},\text{PCM})=T(\text{EVRC},\text{EVRC})=0$
$T(\text{AMR},\text{EVRC})=0.4$, $T(\text{AMR},\text{PCM})=0.17$,
$T(\text{EVRC},\text{AMR})=0.5$, $T(\text{EVRC},\text{PCM})=0.15$,
$T(\text{PCM},\text{AMR})=0.3$, $T(\text{PCM},\text{EVRC})=0.25$, If it is assumed that every terminal talks for the same duration on average, then $\alpha_i = 1/4$ for all i, and the cost function of the equation (1) becomes:

$$A = \sum_{s=1}^{4}\sum_{d=1}^{4}\left(\frac{1}{\operatorname{card}(C(d))}\right)\left(\frac{1}{4}\right)T(C(s), C(d)) \quad \text{(eq. 8)}$$

If $C(i)=\text{AMR}$, $1\leq i\leq 3$, and $C(4)=\text{EVRC}$. Then $\operatorname{card}(C(i))=3$, $1\leq i\leq 3$, and $\operatorname{card}(C(4))=1$.

Accordingly, the value of the cost function A becomes equal to:

$$A = \frac{1}{4}\sum_{s=1}^{4}\sum_{d=1}^{4}\left(\frac{1}{\operatorname{card}(C(d))}\right)T(C(s), C(d)), \quad \text{(eq. 9)}$$

if $C(i) = \text{AMR}, 1 \leq i \leq 3, C(4) = \text{EVRC}$ $$= \frac{1}{4}\left(\begin{array}{l}T(C(1), C(4)) + T(C(2), C(4)) + T(C(3), C(4)) + \\ \frac{1}{3}T(C(4), C(1)) + \frac{1}{3}T(C(4), C(2)) + \frac{1}{3}T(C(4), C(3))\end{array}\right)$$

$$= \frac{1}{4}(3 \cdot T(\text{AMR}, \text{EVRC}) + T(\text{EVRC}, \text{AMR}))$$

$$= \frac{1}{4}(3(0.4) + 0.5) = 0.425$$

Similarly, if $C(i)=\text{AMR}$, $1\leq i\leq 3$, and $C(4)=\text{PCM}$. Then $\operatorname{card}(C(i))=3$, $1\leq i\leq 3$, and $\operatorname{card}(C(4))=1$, and the value of the cost function A becomes equal to:

$$A = \frac{1}{4}(3 \cdot T(\text{AMR}, \text{PCM}) + T(\text{PCM}, \text{AMR})) = \quad \text{(eq. 10)}$$

$$\frac{1}{4}(3(0.17) + 0.3) = 0.2025$$

We can evaluate the cost of other codec possibilities and arrive to the conclusion that this last combination leads to the minimum value with A=0.2025.

Therefore: C*=(AMR, AMR, AMR, PCM) and A*=0.2025.

In general, the embodiments of the present invention permit the optimization of several aspects of the communication system involving multiple terminals that is influenced by the choice of codecs used in the session and for which it is needed to perform transcoding.

The method 200 described herein above permits the selection of media codecs used in a multi-terminals communication session to optimize the transcoding operations affecting the performance of the communication system. Such optimization depends on the media codecs supported by each participant in the communication session.

Although audio examples of AMR and EVRC audio codecs have been provided in above, it is understood that various other codecs may be also used. Embodiments of the invention generally describe H.263 and H.264 transcoding. It is understood that transcoding between a variety of codecs may be performed, such as MPEG-4 part 2, H.264, H.265, H.263, including transcoding between H.264 and H.265.

It is contemplated that the method and system of the embodiments of the present invention may be applied not only to multimedia sessions between multiple users/parties/terminals, but also to any communication activity between multiple users/parties/terminals, when there are many possibilities for selecting transcoding parameters for the transcoding sessions, for example different codecs or other media charateristics, between the parties/terminals to ensure interoperability, while optimizing the measure of performance of the transcoding sessions.

While example embodiments of the present invention described above provide methods and systems for determining optimal values of a media characteristic wherein the media characteristic is a codec, other media characteristics are also within the scope of the present invention. For example, media characteristics such as bitrate, resolution, frame rate, profile/level for video, sampling rate, bandwidth for audio, or the like may be used.

The method and system of the embodiments of the invention are general enough to permit the optimization of other desired properties of a multi-terminal session, such as minimizing energy consumption or bandwidth usage, or a combination of such properties.

The method and system of the embodiments of the invention provide an advantage of optimizing a measure of performance of the transcoding sessions, for example minimizing the computational complexity, thus permitting more communication sessions per server and reducing energy consumption.

Although the embodiments of the invention have been described in detail, it will be apparent to one skilled in the art that variations and modifications to the embodiment may be made within the scope of the following claims.

What is claimed is:

1. A method for optimizing a transcoding session between two or more terminals, the transcoding session being for transcoding from a source codec to a plurality of destination codecs, the method comprising:
using at least one hardware processor for:
(a) determining properties of the transcoding session, comprising:
a number of terminals participating in the transcoding session;
one or more media characteristics supported by each terminal including a current set of source and destination codecs; and
a measure of performance of the transcoding session to be optimized;
(b) building a cost function characterizing the measure of performance of the transcoding session and depending on said properties of the transcoding session;
(c) optimizing the cost function with respect to said measure of performance to determine an optimal set of source and destination codecs based on the media characteristics for each respective terminal;
(d) reserving transcoding resources based on said optimal set of source and destination codecs;
(e) initiating the transcoding session based on said reserved transcoding resources and said optimal set of source and destination codecs; and
(f) storing the properties of the transcoding session in a session data repository stored in a memory device, including storing said optimal set of source and destination codecs as the current set of source and destination codecs.

2. The method of claim 1, wherein the optimizing the cost function comprises minimizing or maximizing the cost function with respect to said measure of performance.

3. The method of claim 1, wherein the number of terminals participating in the transcoding session is three or more, the method further comprising:
(g) upon terminals leaving or joining the transcoding session;
(i) determining updated properties of the transcoding session;
(ii) building an updated cost function characterizing the measure of performance of the transcoding session and depending on said updated properties of the transcoding session;
(iii) optimizing the updated cost function with respect to said measure of performance of the updated transcoding session to determine an updated optimal set of source and destination codecs;
(iv) retrieving the current set of source and destination codecs from the session data repository; and
(iv) provided that the optimal set of source and destination codecs has changed from the current set of source and destination codecs;
(aa) updating transcoding resources based on said updated optimal set of source and destination codecs;
(bb) updating the transcoding session based on said updated transcoding resources and said updated optimal set of source and destination codecs; and
(cc) storing the properties of the updated transcoding session in the session data repository including storing said updated optimal set of source and destination codecs as the current set of source and destination codecs.

4. The method of claim 1, wherein said measure of performance is a computation complexity of the transcoding session.

5. The method of claim 1, wherein said measure of performance is a bandwidth usage of the transcoding session.

6. The method of claim 1, wherein said measure of performance is power consumed by a transcoding server used to perform the transcoding session.

7. The method of claim 1, wherein said measure of performance is a measure of performance of a central processing unit used to perform the transcoding session.

8. The method of claim 1, wherein the building the cost function comprises:

determining a list of codecs supported by the transcoding session;

determining a plurality of sets of codecs wherein each set is a combination of the codecs in the list of codecs that are compatible with each terminal; and determining a plurality of performance indexes for transcoding operations of transcoding from a source codec to a destination codec.

9. The method of claim 8, wherein the optimizing the cost function further comprises:

computing a plurality of respective costs for each of the sets of codecs based on the properties of the transcoding session and the performance indexes; and choosing the optimal set of source and destination codecs from the plurality of sets of codecs for the transcoding session based on a minimum of the computed plurality of respective costs.

10. The method of claim 9, wherein computing the plurality of respective costs comprises computing a sum of the performance indexes of transcoding from the source codec to the destination codec.

11. The method of claim 1, wherein the properties of the transcoding session comprise percentages of respective talk duration for said one or more terminals that are used for determining the optimal set of source and destination codecs.

12. A system for optimizing a transcoding session between two or more terminals, the transcoding session being for transcoding from a source codec to a plurality of destination codecs, the system comprising:

a processor; and a memory device, having computer readable instruction stored thereon for execution by the processor, causing the processor to:

(a) determine properties of the transcoding session, comprising:

a number of terminals participating in the transcoding session;

one or more media characteristics supported by each terminal including a current set of source and destination codecs; and a measure of performance of the transcoding session to be optimized;

(b) build a cost function characterizing the measure of performance of the transcoding session and depending on said properties of the transcoding session;

(c) optimize the cost function with respect to said measure of performance to determine an optimal set of source and destination codecs based on the media characteristics for each respective terminal;

(d) reserve transcoding resources based on said optimal set of source and destination codecs;

(e) initiate the transcoding session based on said reserved transcoding resources and said optimal set of source and destination codecs; and (f) store the properties of the transcoding session in a session data repository stored in the memory device including storing said optimal set of source and destination codecs as the current set of source and destination codecs.

13. The system of claim 12, wherein the processor is configured to minimize or maximize the cost function with respect to said measure of performance.

14. The system of claim 12, wherein the number of terminals participating in the transcoding session is three or more and the processor is further configured to:

(g) upon terminals leaving or joining the transcoding session;

(i) determine updated properties of the transcoding session;

(ii) build an updated cost function characterizing the measure of performance of the transcoding session and depending on said updated properties of the transcoding session;

(iii) optimize the updated cost function with respect to said measure of performance of the updated transcoding session to determine an updated optimal set of source and destination codecs;

(iv) retrieve the current set of source and destination codecs from the session data repository; and (iv) provided that the optimal set of source and destination codecs has changed from the current set of source and destination codecs;

(aa) update transcoding resources based on said updated optimal set of source and destination codecs;

(bb) update the transcoding session based on said updated transcoding resources and said updated optimal set of source and destination codecs; and (cc) store the properties of the updated transcoding session in the session data repository including storing said updated optimal set of source and destination codecs as the current set of source and destination codecs.

15. The system of claim 12, wherein said measure of performance is a computation complexity of the transcoding session.

16. The system of claim 12, wherein said measure of performance is a bandwidth usage of the transcoding session.

17. The system of claim 12, wherein said measure of performance is power consumed by a transcoding server used to perform the transcoding session.

18. The system of claim 12, wherein said measure of performance is a measure of performance of a central processing unit, CPU, used to perform the transcoding session.

19. The system of claim 12, wherein the processor is further configured to:

determine a list of codecs supported by the transcoding session;

determine a plurality of sets of codecs wherein each set is a combination of the codecs in the list of codecs that are compatible with each terminal; and determine a plurality performance indexes for transcoding operations of transcoding from a source codec to a destination codec.

20. The system of claim 19, wherein the processor is further configured to:

compute a plurality of respective costs for each of the sets of codecs based on the properties of the transcoding session and the plurality of performance indexes; and choose the optimal set of source and destination codecs from the plurality of sets of codecs for the transcoding session based on a minimum of the computed plurality of respective costs.

21. The system of claim 20, wherein the processor is further configured to compute the plurality of respective costs comprising a sum of the performance indexes of transcoding from the source codec to the destination codec.

22. The system of claim 12, wherein the properties of the transcoding session comprise percentages of respective talk duration for said one or more terminals that are used for determining the optimal set of source and destination codecs.

* * * * *

UNITED STATES PATENT AND TRADEMARK OFFICE
CERTIFICATE OF CORRECTION

PATENT NO. : 9,356,987 B2
APPLICATION NO. : 14/019409
DATED : May 31, 2016
INVENTOR(S) : Stephane Coulombe Page 1 of 1

It is certified that error appears in the above-identified patent and that said Letters Patent is hereby corrected as shown below:

In the Claims

Column 24, line 13, "reserved" should read --established--

Column 25, line 53, "reserved" should read --established--

Signed and Sealed this
Second Day of August, 2016

Michelle K. Lee
*Director of the United States Patent and Trademark Office*